US011037054B2

(12) United States Patent
Davies et al.

(10) Patent No.: US 11,037,054 B2
(45) Date of Patent: Jun. 15, 2021

(54) TRACE-BASED NEUROMORPHIC ARCHITECTURE FOR ADVANCED LEARNING

(71) Applicant: Intel Corporation, Santa Clara, CA (US)

(72) Inventors: Michael I Davies, Portland, OR (US); Andrew M Lines, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1145 days.

(21) Appl. No.: 15/385,219

(22) Filed: Dec. 20, 2016

(65) Prior Publication Data

US 2018/0174040 A1    Jun. 21, 2018

(51) Int. Cl.
*G06N 3/08* (2006.01)
*G06N 3/063* (2006.01)
*G06N 3/04* (2006.01)

(52) U.S. Cl.
CPC .............. *G06N 3/08* (2013.01); *G06N 3/049* (2013.01); *G06N 3/063* (2013.01)

(58) Field of Classification Search
CPC ................................. G06N 3/08; G06N 3/063
See application file for complete search history.

(56) References Cited

U.S. PATENT DOCUMENTS

| 5,293,457 | A | * | 3/1994 | Arima | .................... | G06N 3/063 706/34 |
| 5,630,020 | A | * | 5/1997 | Makram-Ebeid | ........ | G06N 3/08 706/25 |
| 6,115,108 | A | * | 9/2000 | Capodieci | ........... | G03F 7/70125 355/71 |
| 7,814,038 | B1 | * | 10/2010 | Repici | ...................... | G06N 3/08 706/25 |
| 9,111,225 | B2 | | 8/2015 | Hunzinger et al. | | |
| 9,189,730 | B1 | * | 11/2015 | Coenen | .................. | G06N 3/049 |
| 2003/0004907 | A1 | * | 1/2003 | Matsugu | .............. | G06K 9/4628 706/26 |

(Continued)

OTHER PUBLICATIONS

Valko et al. (Evolutionary Feature Selection for Spiking Neural Network Pattern Classifiers, Dec. 2005, pp. 1-7) (Year: 2005).*

(Continued)

*Primary Examiner* — George Giroux
(74) *Attorney, Agent, or Firm* — Schwegman Lundberg & Woessner, P.A.

(57) ABSTRACT

A neuromorphic computing apparatus has a network of neuromorphic cores, with each core including an input axon and a plurality of neurons having synapses. The input axon is associated with an input data store to store an input trace representing a time series of filtered pre-synaptic spike events, and accessible by the synapses of the plurality of neurons of the core. Each neuron includes at least one dendritic compartment to store and process variables representing a dynamic state of the neuron. Each compartment is associated with a compartment-specific data store to store an output trace representing a time series of filtered post-synaptic spike events. Each neuron includes a learning engine to apply a set of one or more learning rules based on the pre-synaptic and post-synaptic spike events to produce an adjustment of parameters of a corresponding synapse to those spike events.

25 Claims, 12 Drawing Sheets

(56) References Cited

U.S. PATENT DOCUMENTS

| | | | | |
|---|---|---|---|---|
| 2008/0319933 A1* | 12/2008 | Moussa | ............ | G06N 3/084 706/31 |
| 2013/0073491 A1* | 3/2013 | Izhikevich | ............ | G06N 3/049 706/15 |
| 2015/0242743 A1 | 8/2015 | Esser et al. | | |
| 2016/0086076 A1* | 3/2016 | Alvarez-Icaza Rivera | ............ | G06N 3/06 706/25 |
| 2016/0283840 A1* | 9/2016 | Amir | ............ | G06N 3/049 |
| 2017/0193353 A1* | 7/2017 | Lee | ............ | G06N 3/049 |

OTHER PUBLICATIONS

Sak et al. (Long Short-Term Memory Based Recurrent Neural Network Architectures for Large Vocabulary Speech Recognition, Feb. 2014, pp. 1-5) (Year: 2014).*

Papageorgiu et al. (Learning Fuzzy Grey Cognitive Maps using Nonlinear Hebbian-based approach, Jan. 2012, pp. 54-65) (Year: 2012).*

"European Application Serial No. 17202651.0, Extended European Search Report dated Apr. 30, 2018", 11 pgs.

Florian, R. V, "A Reinforcement Learning Algorithm for Spiking Neural Networks", Symbolic and Numeric Algorithms Forscientific Computing. 2005. SYNASC 2005.Seventh International Symposium on Timisoara, Romania Sep. 25-29, 2005, Piscataway, NJ, USA, IEEE, (Sep. 25, 2005), 8 pgs.

Florian, Razvan V, "Reinforcement Learning Through Modulation of Spike-Timing-Dependent Synaptic Plasticity", Neural Computation 19, XP055361639, [Online] Retrieved from the internet:http: florian.io papers 2007 Fiorian_Modulated_STDP.pdf, (Jan. 1, 2007), 1468-1502.

Steve, Furber, "Large-scale neuromorphic computing systems", Journal of Neural Engineering, Institute of PhysicsPublishing, Bristol, GB, val. 13, No. 5, (Aug. 16, 2016), 14 pgs.

"European Application Serial No. 17202651.0, Response filed Nov. 15, 2018 to Extended European Search Report dated Apr. 30, 2018", 10 pgs.

"European Application Serial No. 17202651.0, Communication Pursuant to Article 94(3) EPC dated Feb. 1, 2019", 10 pgs.

"European Application Serial No. 17202651.0, Response filed Jun. 3, 2019 to Communication Pursuant to Article 94(3) EPC dated Feb. 1, 2019", 12 pgs.

"European Application Serial No. 17202651.0, Summons to Attend Oral Proceedings mailed Sep. 30, 2020", 8 pgs.

* cited by examiner

Pairwise STDP:

$$f_W(W) = W - A_- x_0(t)y_1(t) + A_+ x_1(t)y_0(t)$$
$$= W + S_1 P_X(y_1) + S_2 P_Y(x_1)$$

$$(S_1 < 0)$$

Triplet STDP with heterosynaptic decay:

$$f_W(W) = W - A_- x_0(t)y_1(t) + A_+ x_1(t)y_0(t)y_2(t) - B \cdot W \cdot y_3(t)$$
$$= W + S_1 P_X(y_1) + S_2 P_Y(x_1, y_2) + S_3 P_U(W, y_3)$$

$$(S_1, S_3 < 0)$$

Distal Reward with Synaptic Tags:

$$f_T(T) = T - A_- x_0(t)y_1(t) + A_+ x_1(t)y_0(t) - B \cdot T$$
$$= T + S_1 P_X(y_1) + S_2 P_Y(x_1) + S_3 P_U(T)$$

$$f_W(W) = W + C \cdot r_0(t)r_1(t) \cdot T$$
$$= W + S_4 P_R(r_1, T)$$

Delay STDP:

$$f_D(D) = D - A_- x_0(t)(127 - y_1(t))$$
$$+ A_+(127 - x_1(t))y_0(t)$$
$$= D + S_1 P_X(y_1 - 127) + S_2 P_Y(x_1 - 127)$$

E-STDP with dynamic weight consolidation:

$$f_W(W) = W - A_- x_0(t)y_1(t) + A_+ x_1(t)y_0(t)y_2(t) - B_1(W - T)y_3(t)y_0(t)$$
$$= W + S_1 P_X(y_1) + S_2 P_Y(x_1, y_2) + S_3 P_Y(W, y_3) + S_4 P_Y(T, y_3)$$

$$f_T(T) = T + \frac{1}{\tau_{cons}}(W - T) - B_2 T(w_\theta - T)(w_{max} - T)$$
$$= T + S_5 P_U(W) + S_6 P_U(T) + S_7 P_U(T, T + 2C_1, T + 2C_2)$$

*FIG. 11*

TRACE-BASED NEUROMORPHIC ARCHITECTURE FOR ADVANCED LEARNING

TECHNICAL FIELD

The present disclosure relates generally to neuromorphic computing using digital neuromorphic cores and, more particularly, to a neuromorphic system architecture that uses a variety of filtered spike train variables, or traces, and a configurable learning engine in order to support advanced neural network learning algorithms.

BACKGROUND

A neuromorphic processor is a processor that is structured to mimic certain aspects of the brain and its underlying architecture, particularly its neurons and the interconnections between the neurons, although such a processor may deviate from its biological counterpart. A neuromorphic processor may be composed of many neuromorphic (neural network) cores that are interconnected via a network architecture such as a bus or routing devices, which can direct communications between the cores. The network of cores may communicate via short packetized spike messages sent from core to core. Each core may implement some number of primitive nonlinear temporal computing elements (e.g., neurons). When a neuron's activation exceeds some threshold level, it may generate a spike message that is propagated to a set of fan-out neurons contained in destination cores. The network then may distribute the spike messages to destination neurons and, in turn, those neurons update their activations in a transient, time-dependent manner.

A variety of machine-learning approaches have been proposed to train neural network models and neuromorphic processors. Conventionally, some learning processes utilize an error back-propagation technique, which tends to be costly in terms of computational resources and energy. Accordingly, in practical systems, the back-propagation learning operation tends to be implemented in server farms, or in systems with high computing capacity. Other learning techniques have also been proposed, including unsupervised, real-time machine learning methods in spike timing-dependent plasticity (STDP) architectures. In ideal conditions, where there is an absence of noise or other disturbances, some of these techniques show promise. However, in practical, real-world conditions, achieving reliable, accurate learning in STDP-based neuromorphic processors has been elusive.

BRIEF DESCRIPTION OF THE DRAWINGS

FIG. 11 lists various examples of learning rules.

DETAILED DESCRIPTION

Figure 1:
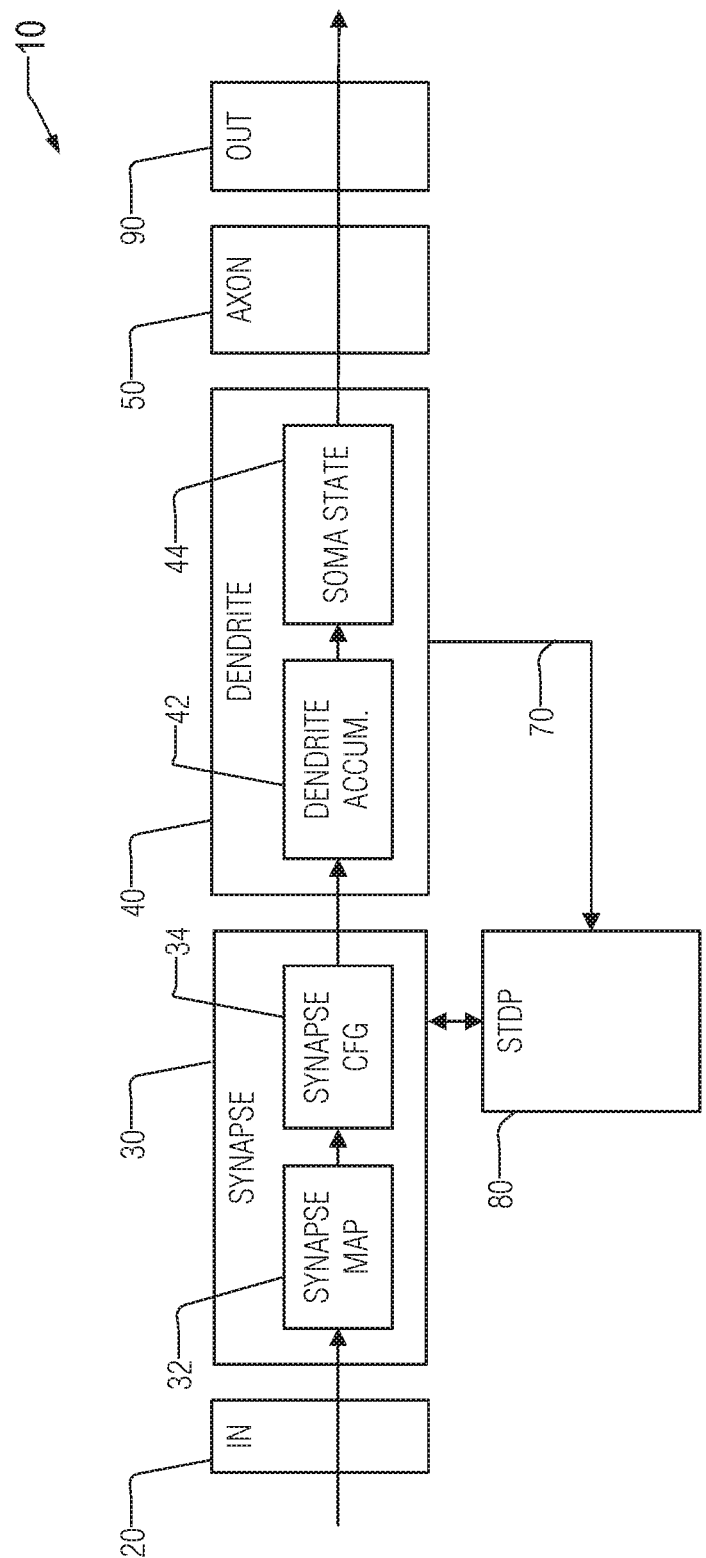
FIG. 1 is a high-level block diagram of a model neural core structure.

Aspects of the embodiments are directed to a spike-based neuromorphic computing architecture that supports a variety of neural network learning rules, in particular rules that are formulated in terms of local state variables that can be accessed and computed in an event-driven manner with a minimum of global communication across the network. These local state variables are, in some embodiments, exponentially filtered forms of the spike trains that the synapses and neurons of the network propagate, consume, and generate. The mathematically simple and biologically inspired function of exponential filtering, or smoothing, allows a rich space of temporal correlations to be computed over the spike events that the various adaptive elements in the network (typically synapses) are exposed to. For example, correlations between input spikes to a synapse and the output spikes from a synapse's downstream neuron, may be locally calculated at each synapse over a variety of time scales that then modify the synaptic connection's weight, or strength, according to some relation between those correlation calculations. The large-scale assembly of such synapses with temporally dynamic state variables, each locally evolving in such a manner, allows the network as a whole to self-organize in response to the input statistics to which the network is exposed. Recent findings in computational neuroscience suggest that such high-dimensional dynamic processes lead to a wide variety of emergent learning behaviors, dependent on the local rules, of potentially significant practical value.

The adaptive neuromorphic very large scale integrated (VLSI) systems explored to date have clustered in two domains: (1) analog circuits that attempt to electrically emulate the spike train filtering processes and synaptic dynamics found in biological neurons, and (2) digital circuits with highly simplified spike timing dependent plasticity rules formulated in terms of the pairwise timing separation of consecutive spikes. The former category is constrained by the limitations of today's analog VLSI technology, specifically the range of circuit dynamics that can be modeled in a functional and manufacturable way, and they may further suffer from the general inflexibility of analog circuits once fabricated. The domain of digital neuromorphic circuits offers advantages in manufacturability, performance, and programmability compared to the analog domain. However the basic spike filtering dynamics present in biological neurons are much less amenable to digital circuit implementation, and for that reason digital designs developed to date have restricted their learning rules to the simplified regime of so-called pairwise "Delta-T" based rules (meaning ΔT, representing the arrival time difference between consecutive spikes). These simple spike timing-dependent plasticity (STDP) rules use the hardware to only measure the time separation between consecutive spike events, a function that can be implemented simply and efficiently with digital circuits. Unfortunately, rules expressed only in terms of spike-to-spike ΔT quantities fail to capture higher-order statistical correlations over a variety of timescales that are essential for supporting the rich adaptation behaviors found in biological neurons.

In relation to the state-of-the-art described above, the neuromorphic architecture disclosed herein significantly expands the diversity and complexity of learning rules that can be efficiently implemented with digital circuits. One feature in this architecture according to some embodiments is the pervasive use of exponentially-filtered spike trains, referred to in the present context as traces, at a variety of points in the circuits. For the benefit of silicon area efficiency, the architecture maintains a large number of such traces by storing only the minimal amount of state needed and aggressively shares that state over related neural structures. For performance and energy efficiency, the architecture computes samples of the trace variables that the learning rules require only on demand, over delayed epoch-based intervals in order to minimize wasted calculations. Another key ingredient, described in detail below for one embodiment, is a configurable learning engine that combines the trace variables so calculated using programmed microcode in order to support an extremely broad space of learning rules. The microcode-based learning engine provides sufficient programmability for this purpose without sacrificing the fundamental neuromorphic properties that distinguish the overall architecture from more conventional programmable architectures (such as the Von Neumann CPU).

In a neuromorphic computing system based on event-driven spike computation, a network of neural network cores communicate via short packetized spike messages sent from core to core. Each core implements some number of neurons, which operate as primitive nonlinear temporal computing elements. When a neuron's activation exceeds some threshold level, it generates a spike message that is propagated to a set of fan-out neurons contained in destination cores. In managing its activation level, each neuron maintains a trace variable that is incremented (e.g., as an impulse response) in response to each spike. Following each spike, the trace variable decays in an exponential manner. This exponential decay, modeled as an exponential function, may continue for a number of time steps, during which additional spikes may or may not arrive.

The network distributes the spike messages to all destination neurons, and in response those neurons update their activations in a transient, time-dependent manner, similar to the operation of real biological neurons.

FIG. 1 is a simplified block diagram illustrating an example neural core structure 10 that loosely models a biological neural structure. An action potential, or spike, message is provided at an input 20 to the synapse 30. Input 20 in this example represents an input axon, identified by some axon_id identifier carried by the spike message, and maps to a list of fan-out synaptic connections within the core via two stages of indirection: synapse map 32 and synapse cfg 34. Synapse map 32 maps the spike message's axon_id to a (base_address, length) pair identifying a base address in the synapse cfg memory 34 and a list length of entries containing fanout synaptic connections for the axon_id. Each entry read from the synapse cfg memory 34 specifies some number of synaptic connections comprising a three-tuple (dendrite_idx, weight, delay), and possibly more information described below for learning.

Each three-tuple is provided to a dendrite structure 40 comprising a dendrite accumulator 42 and a soma state store 44. Based on the dendrite_idx of the three-tuple, corresponding to the fanout dendrite to which the synapse connects, and the synapse's delay (or the minimum value of 1, if none is specified), the weight is added to an appropriate weight accumulation counter for the appropriate future time step. The dendrite process 40 concurrently reads all weight sums that have accumulated for the current time step, by sequentially reading from incrementing dendrite_idx addresses in the dendrite accumulator memory 42 and sends these to the soma state store 44. Based on this aggregated weight input, the soma updates its activation state according to a spiking neuron model, such as the Leaking Integrate and Fire (LIF) model, for example.

When the soma enters a sufficiently activated state, it may produce new spikes that the dendrite structure 40 outputs to an axon 50 (this is actually a fan-out of the spike within the core to other destination cores) for subsequent output 90.

Not shown is a routing network that distributes the spikes, in the form of individually addressed data packets, to the appropriate destination cores in a greater system. The outputs core or set of cores include the core that produced each spike. The core's network environment also provides global time synchronization across all cores in the system so their local understanding of the current time step stays sufficiently consistent.

Figure 2:
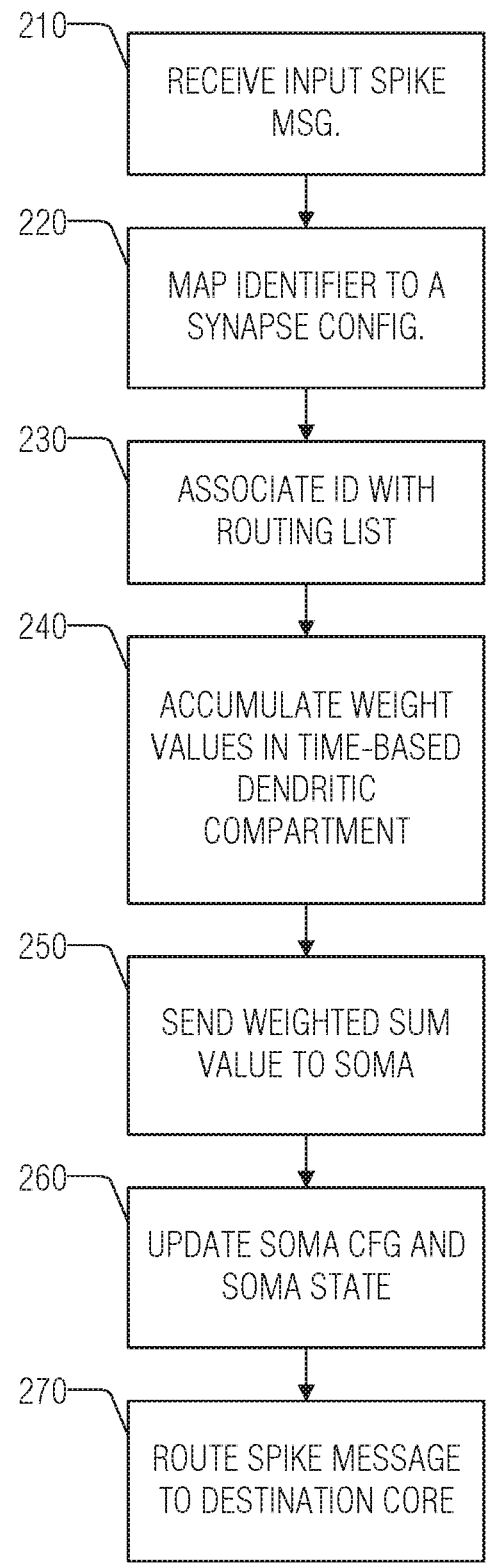
FIG. 2 is a flow diagram illustrating an example process carried out as part of the operations of the neural core structure of FIG. 1 according to an illustrative example.

The spike data flow described above corresponds to the inference, or spiking, phase of the core. During inference, no STDP parameter adaptations are applied. FIG. 2 is a flow diagram illustrating an example process carried out as part of the core's operations in the inference phase according to an illustrative example. In operation 210, the synapse 30 receives an input spike message, and in operation 220 an identifier, such as the axon_id, is mapped to a synapse configuration. In operation 230, the identifier is associated with a routing list. In operation 240, weight values are accumulated in time-based sections of a dendritic compartment in an accumulator. In operation 250, a weighted sum value for the dendritic compartment is sent to the soma. In operation 260, the soma configuration and soma state are updated based on the weighted sum value. In operation 270, a spike message is routed to the destination core.

Figure 3A:
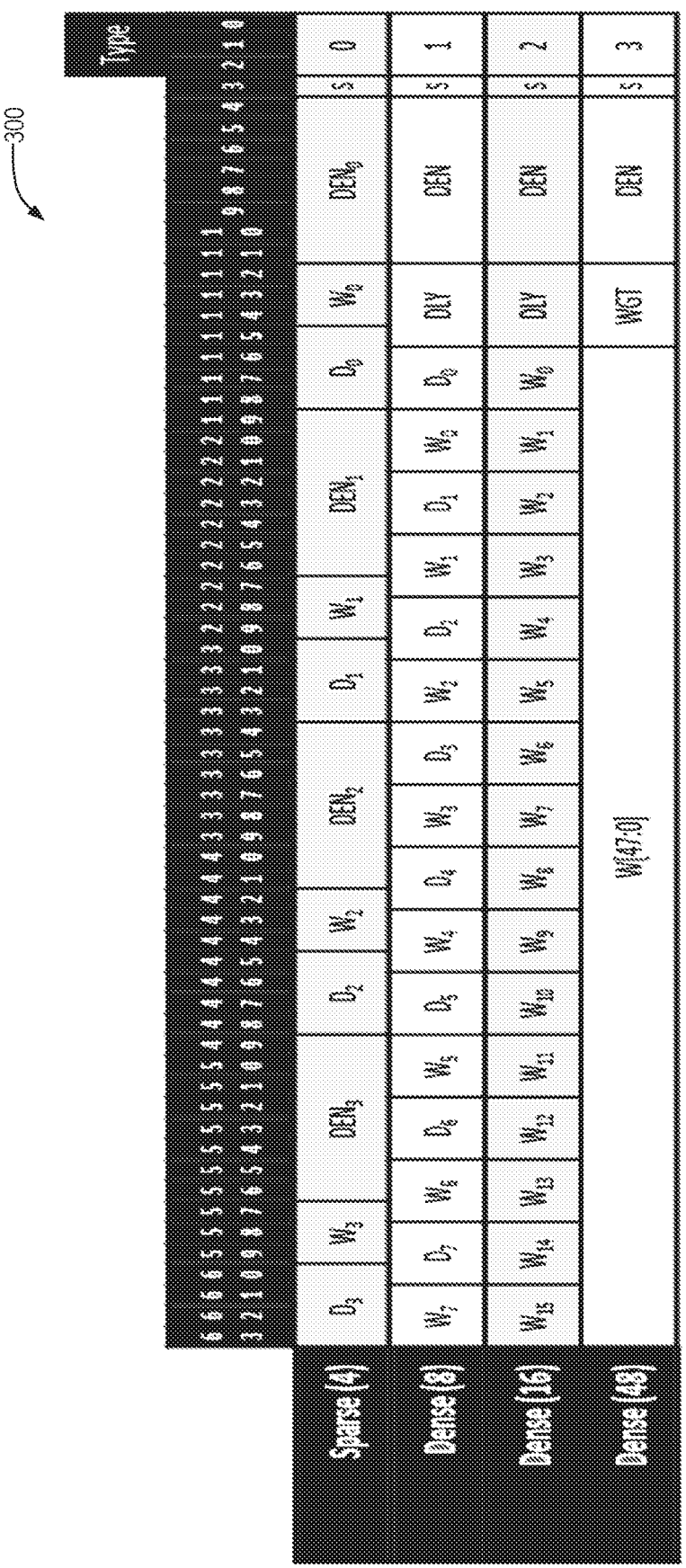
FIG. 3A and FIG. 3B illustrate aspects of the mapping operations of the synapse structures shown as part of the structure of FIG. 1 according to some examples.
Figure 3B:
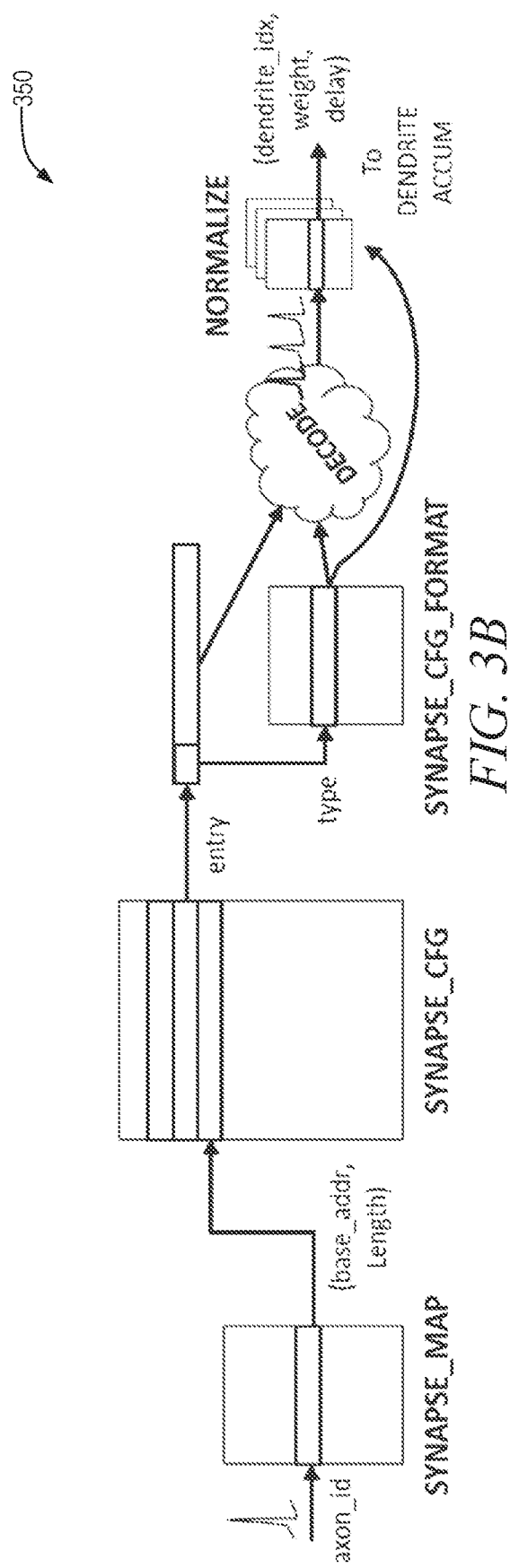

FIG. 3A and FIG. 3B illustrate aspects of the mapping operations of the synapse map 32 and synapse cfg 34 structures in greater detail according to some examples. FIG. 3A provides an example encoding of the entries 300 contained within the synapse map memory 32. As shown, the specific bit fields in these entries may be configurably formatted based on type bits embedded in the entry. This is to allow some entry types to contain fully specified dendrite_idx (DEN) values per synapse, as shown for Type 0 in the example, while other entries may contain fewer dendrite_idx bits so more synapses may be stored per entry. In the latter case, one base DEN value is specified in the entry, and the dendrite_idx for each synapse in the entry is calculated as an incrementing offset from DEN. Further, some entries may contain more bits of weight per synapse, fewer delay, or vice versa. Not shown in the example of FIG. 3A are additional synaptic parameters that may be stored in the synapse cfg entry associated with each synaptic connection, such as tag fields and bits to enable or disable learning on specific synapses. These are described in more detail below. FIG. 3B is a diagram illustrating an example data flow 350 in the handling of an input spike, including memory reads, patterns and the logic to produce an output (dendrite_idx, weight, delay) three-tuple that is sent to the dendrite accumulator 42. In general there are many of these three-tuples produced and accumulated for each input spike received.

In order for such a core to support synaptic adaptation, specifically STDP learning rules, the system may also support backwards-propagation of spike information from soma to synapse. In biology, when the soma spikes, in addition to that spike propagating downstream to the output neurons, the spike also propagates backwards down through a dendritic tree, which is beneficial for learning. The synaptic plasticity at the synapses is a function of when the post-synaptic neuron fires and when the pre-synaptic neuron fires. Each synapse self-adjusts its parameters based on the correlations in activity between its input and output neurons, as indicated by their spike times. In a multi-compartment architecture, once the soma fires, there are other elements that must know that the neuron fired in order to support learning, e.g., so all of the input fan-in synapses 30 can see that the neuron fired. The spike timing dependent plasticity (STDP) engine 80 may receive this backwards action potential (bAP) notification 70 and communicate with the synapses 30 accordingly by modifying synaptic parameters.

Notably, in some embodiments, each component of the neuromorphic core described above, corresponding loosely to the analogous functions in a biological neuron, is replicated for a potentially large number of these elements contained within the core. The logical processing of these state elements within the core occurs in a sequential, time-multiplexed manner.

Figure 4A:
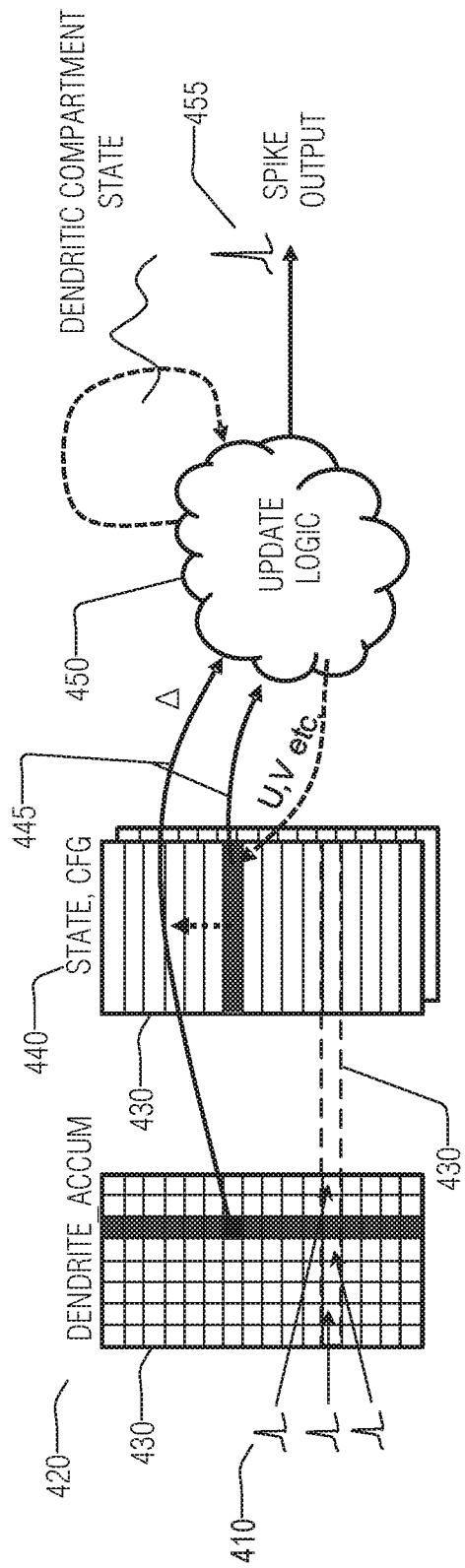
FIG. 4A is a diagram that illustrates an example configuration of a multi-compartment neuronal and a dendritic accumulation process for handling and scheduling spikes into the future according to an example.

FIG. 4A is a diagram that illustrates an example configuration of a multi-compartment neuronal and a dendritic accumulation process for handling and scheduling spikes into the future inside the core. Synaptic inputs 410 are provided to a dendrite accumulator structure 420, which may be configured as a dedicated data store, or a data structure allocated in a general data store, to maintain synaptic stimulation counters of weight values for a particular compartment 430. In the present context, a compartment 430 is an abstract neural unit that contains state and configuration variables 440 representing the dynamic state of a neuron. It is a component of a dendritic tree that may be processed in sequence with related compartments. Preserving some state information for a compartment 430 and passing it along as the compartments are processed provides for a broad class of information inference-phase processing that may take place in the core.

A dendrite accumulator structure 420 may maintain synaptic stimulation counters of weight values for a particular compartment 430, with the compartment being a breakdown of a neural tree structure or simply an abstract neural unit. Each compartment 430 may have state variables (u, v) that contain a dynamic state of what is occurring in the neuron.

A sequential process with the update logic 450 may walk through all of these compartments 430 (technically, compartment indices), and receive configuration parameters and state variables 445 from each of the compartments 430. As a result of the update, the compartment may generate a spike output 455. Because this is a sequential process, it is inexpensive and easy to preserve some state information that is associated with propagating information of the tree while the update logic loops over the compartment indices 450. This can be accomplished by utilizing temporary register storage in the logic.

Figure 4B:
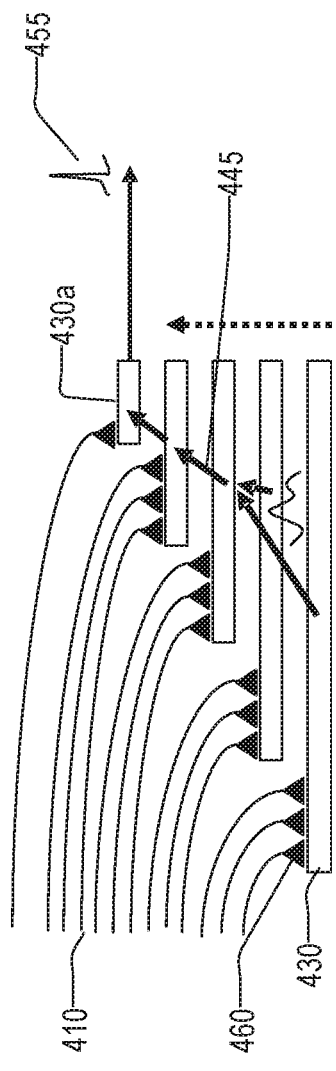
FIG. 4B is a pictorial diagram that shows a state structure of multiple compartments and illustrates how the sequential walk through the compartment indices can implement a tree-structured data flow according to an example.

FIG. 4B is a pictorial diagram that shows a state structure of multiple compartments and illustrates how the sequential walk through the compartment indices 430 can implement a tree-structured data flow. Each of the rows 430 of this state structure, which may be memory elements in the core's SRAMs, represents a compartment 430 that receives synaptic input 410, via synaptic connections 460. The core walks through these with state variables 445 being propagated from each of the compartments 430, up to one final route compartment 430a which would be the soma (in the biological nomenclature), which provides a spike output 455. All of the other compartments 430 in FIG. 4B are simply passing on their intermediate terms. Any dendrite index may be configured as either a compartment in the dendritic tree or a soma. The tree structure may be implemented by propagating and combining real-valued current and/or voltage states iteratively, in some fixed-point digital encoding, as described below.

Figure 5:
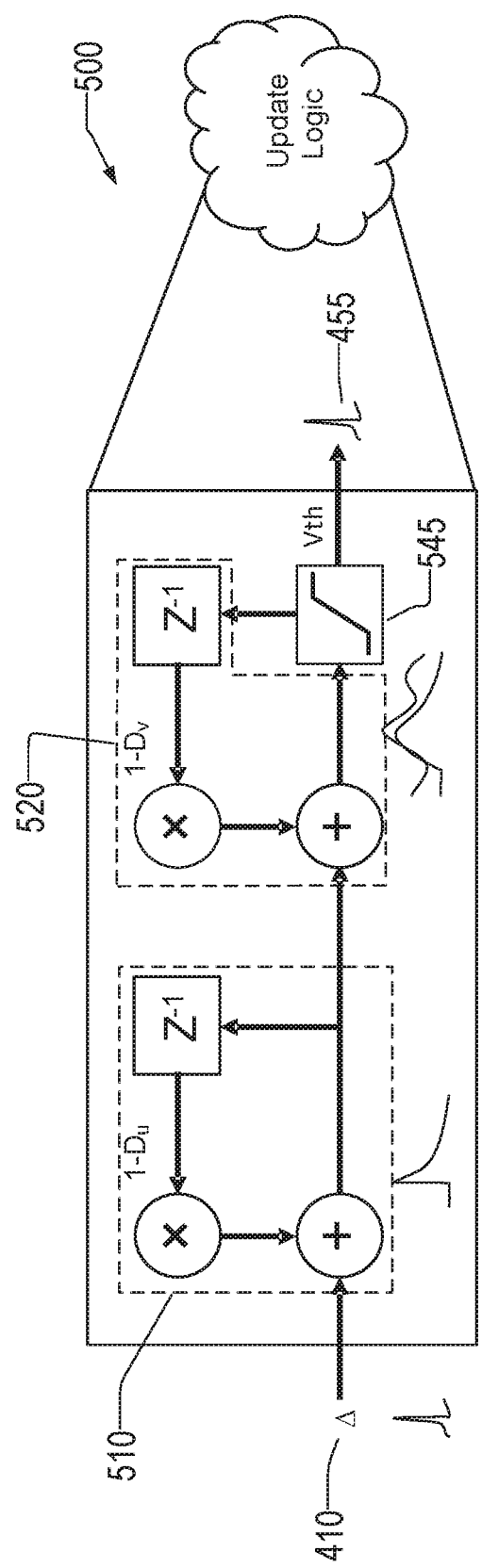
FIG. 5 is a block diagram illustrating state dynamics for a dendritic compartment according to an example.

FIG. 5 is a block diagram illustrating state dynamics for a dendritic compartment 500 (use of the term "dendrite" below is to be construed synonymous with, and as shorthand for, the phrase "dendritic compartment") according to a simple neuron model, which is basically a discrete-time filtering circuit that applies a filtering function. A first state variable operation 510 may be performed that is based on a stored first state variable, in this example, the current u, and the spike input 410 received. A second state variable operation 520 may then subsequently be performed that is based on a stored second state variable, in this example, the voltage v, and the output of the first variable operation 510. A threshold function 545 may be utilized to determine if the dendritic compartment 500 should spike or at least indicate a spiking value even if it does not actually spike.

The compartment signal processing model shown in FIG. 5 represents one possible embodiment that implements a simple current-based Leaky Integrate-and-Fire (LIF) neuron model. The subthreshold dynamics of the LIF neuron model are described by the following discrete-time dimensionless difference equations, as provided by filters 510 and 520 respectively:

$$u[t] = \left(1 - \frac{1}{\tau_s}\right)u[t-1] + \sum_{i \in l} w_i s_i[t]$$

$$v[t] = \left(1 - \frac{1}{\tau_m}\right)v[t-1] + u[t] + b$$

where:

$\tau_s$ and $\tau_m$ are synaptic and membrane time constants, respectively;

l is the set of fanin synapses for the neuron;

$w_i$ is the weight of synapse i;

$s_i[t]$ is the count of spikes received for time step t at synapse i, after accounting for synaptic delays;

b is a constant bias current; and $\Delta = \sum_{i \in l} w_i s_i[t]$ corresponds to dendrite accumulator input 410.

For computational efficiency, as an example, the exponential scalings are configured and scaled according to the following fixed-point approximation:

$$\left(1 - \frac{1}{\tau}\right) \approx \frac{4096 - D}{4096}$$

where the D decay constants ($D_u$ and $D_v$ in FIG. 5) can range over [0,4096], corresponding to τ time constants nonlinearly spaced over the range [1,∞].

When the membrane voltage v[t] passes some fixed threshold Vth from below, the compartment generates an output spike 455.

A neuron may be stimulated with both excitatory and inhibitory input, each with its own exponential filtering time constant. This spiking neuron model and networks of these neurons may be capable of implementing powerful neural information processing algorithms (e.g., E/I networks).

With the multi-compartment support described herein, an E/I neuron may be constructed out of two primitive units, one that integrates the "E" input with the $\tau_E$ time constant, the other the "I" input with $\tau_I$ time constant. In another example, a more complex single neuron model may include the complexity of the E/I neuron implementation. Since many neuromorphic algorithms may not need this complexity, the presently described architecture provides a flexible and efficient neuromorphic processing solution. The architecture can be generalized to an extremely flexible neuromorphic neuron processor that can, through programming, implement conventional neuron models (some with potentially significant value for machine learning applications).

In biology, an efficiency can be realized by communicating numbers (i.e., continuous data) as opposed to just binary spike values 455. The generation of neural networks that is focused on spiked base signaling is largely driven by the efficiency that comes from long-range parallel communication using just a bare minimum of information for energy and performance efficiency. Although it is possible to process a large space of algorithmic problems with a spike based signaling methodology, this approach only goes so far. There is still value in communicating numbers as opposed to just binary spike events 455 with temporal codes, specifically when the communication is sufficiently local. Biological neurons use their dendritic trees for this purpose. A dendritic tree may be viewed as a spatially local region of the neuron over which it is efficient to send continuous current or voltage values across the membrane of the neuron.

A series of join operations may be provided that are similar to an instruction set that the core supports. For example, one might add the u variable along with an input from another compartment. Or, instead of an add, a multiply may be used as the join operation. One could also include, for example, an AND of a spiking condition of whether the input compartment is past its threshold or not, and then whether this compartment's v has passed its threshold or not—one could take the AND condition of those two, or the OR condition of those two. There are a number of different operations that may be defined (see Table 1 below).

The structure so described that propagates information from compartment to compartment gives the dendritic tree structure a large amount of computational capability, compared to either a conventional feed-forward Artificial Neural Network model or a pure spike-based network. In particular, the propagation of fixed-point state variables on successive time steps in the core create a very flexible interlinked dynamic system of these differential equation state variables.

To support the learning capabilities of the core, the design features backwards propagation of information in addition to forward propagation. Disrupting the forward iteration over the units comes at a cost in performance and energy and therefore is only done sparingly, i.e., whenever a unit spikes. Typically, this occurs when the root of the tree, corresponding to the neuron's soma compartment, spikes. This generates a backwards action potential (or bAP), an event-driven sequential traversal of the sequential units in the root-to-leaf direction in order to propagate spiking information back to the synapses for synaptic plasticity (e.g., weight updates according to STDP rules).

A set of operations may be provided, described in more detail in Table 1 below, that can be viewed as an instruction set of what the core supports. For example, one could add from the u variable and provide input from the other compartment 440. One could multiply, take an AND of a spiking condition of whether the input compartment is past its threshold or not, and then whether the destination compartment has passed its threshold or not. One could also take an OR of those two, or use any number of different defined join operations. This approach gives the dendritic tree structure a huge amount of computational capability.

Furthermore, the recurrent connections often present in the larger network, along with the inherent temporal dimension of spiking neural networks, serve to dynamically interlink these state variables as a system of nonlinear integral equations, giving the system computational capabilities far beyond those of a simple feed-forward calculator.

TABLE 1

| Field | Bits | Description | Encoding | |
|---|---|---|---|---|
| StackIn | 15:14 | Compartment stack input handling | 0: (SKIP) | Don't read from the CStack |
| | | | 1: (PEEK) | Peek from the CStack |
| | | | 2: (POP) | Pop from the CStack |
| | | | 3: (POP2) | Pop two from the CStack |
| StackOut | 13:12 | Compartment stack output handling | 0: (SKIP) | Don't push to the CStack |
| | | | 1: (PUSH) | Push (Y, S) to the CStack |
| | | | 2: (PUSHN) | Push (normalize(Y), S) to the CStack |
| JoinOp | 11:8 | Compartment join operation | 0: (NOP) | |
| | | | 1: (ADD_U) | U' = U+A+B |
| | | | 2: (MAX_U) | U' = max(U, A, B) |
| | | | 3: (MIN_U) | U' = min(U, A, B) |
| | | | 4: (PASS_U) | U' = A.S ? U+B : 0 |
| | | | 5: (BLOCK_U) | U' = A.S ? 0 : U+B |
| | | | 6: (OR_S) | S' = A.S\|B.S\|S |
| | | | 7: (AND_S) | S' = A.S\|B.S* & S |
| | | | 8: (MUL_V) | U' = U+B; V' = |

TABLE 1-continued

| Field | Bits | Description | Encoding |
|---|---|---|---|
| | | | V * A/$2^{23}$ |
| ThreshOp | 7:6 | Operation to apply when V > Vth | 0: Spike<br>1: Spike w/ random RefractDelay<br>2: Evaluate S=V>Vth only<br>3: Evaluate S=V>Vth and saturate at Vth |
| bAP_Src | 5:2 | Mask over potential bAP sources | 0: Activate bAP when V>Vth<br>1: unused<br>2: Activate bAP when S=1 from cx input 0<br>3: Activate bAP when S=1 from cx input 1 |
| bAP_Action | 1:0 | Action to apply when bAP occurs | Bit 0: Activate refractory state<br>Bit 1: Propagate bAP backwards |

*B.S=1 if not valid (i.e., when JoinOp==POP, not POP2

Example Operations

Thus, this construction makes the neural processor more closely analogous to a "normal" digital computer's processor—it is a programmable structure (in a sense), where each compartment, through programming, can be controlled to function in a particular manner, through its input stack operation, its output stack operation, join operation(s), the threshold operation (whether to spike when a threshold is exceeded, or even whether the threshold is simply evaluated but does not change the neuron state, as a spike would (i.e., just conveying the state of whether the threshold has been exceeded or not)). These functions may all be programmed in the form of compartment configuration parameters, and this may be considered part of the programming of the core. This "programming" causes the core to execute different neuromorphic algorithms as a result of the multi-compartment dendritic interactions.

In biology, when the soma spikes, the spikes often propagate backwards, or towards the leaves, through the dendritic tree, and this mechanism is beneficial for learning. The plasticity at the synapses is a function of when and how often the post-synaptic neuron fires as well as when and how often the pre-synaptic neuron fires, so the synapse needs to be informed of the timing of these events. A multi-compartment architecture may pose a problem for learning once the soma compartment fires, since there are other input compartments that also need to be informed that the neuron fired in order to support learning, so that all of its input fan-in synapses can see that event. This may be part of a spike timing dependent plasticity (STDP) model, which may implement Hebbian learning, anti-Hebbian learning, and other models. In an example, microcode-programmable equations may be used to produce new weights, synaptic delays, and auxiliary "tag" state variables as a function of pre- and post-synaptic trace variables and the initial weight/delay/tag variables. In another example, a reinforcement-based learning model is applied in which a separate stimulus is received from the environment and interpreted by the learning engine as a reward or punishment, based on the graded value communicated by its associated reward message.

Figure 6:
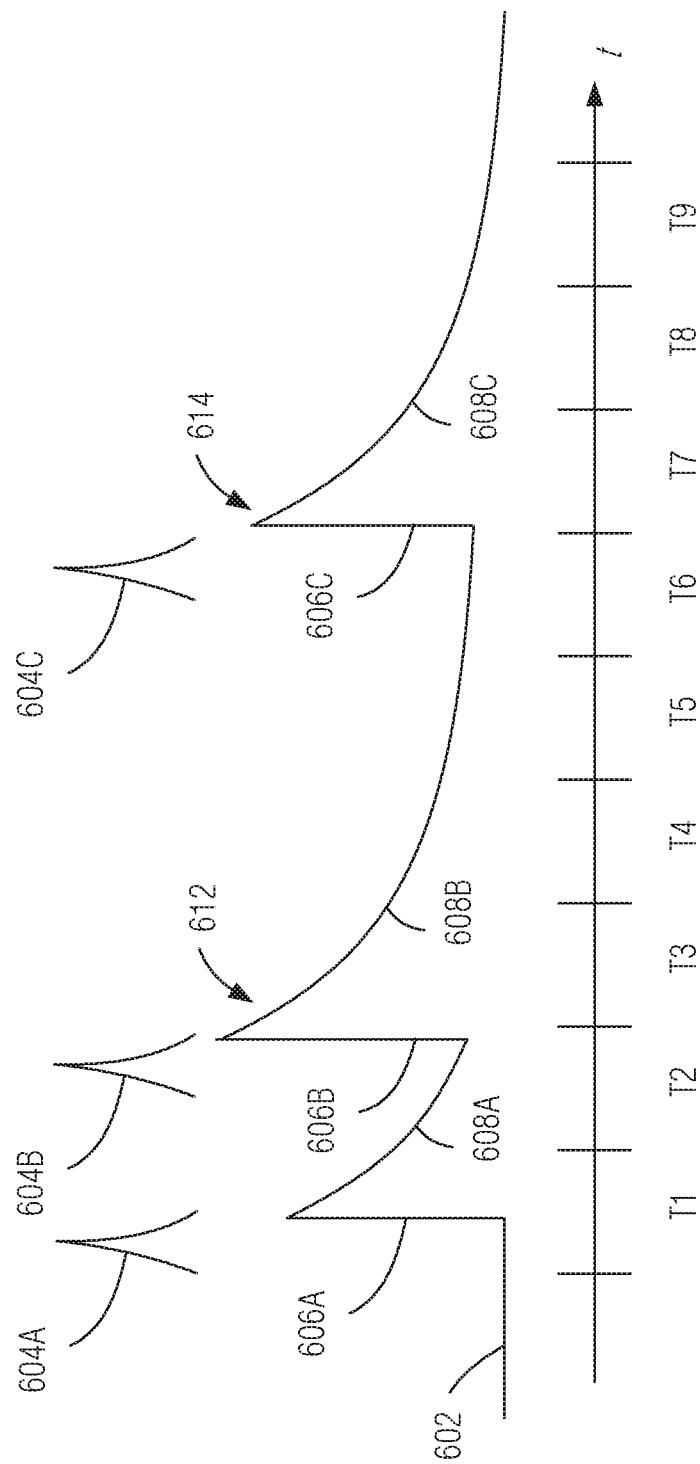
FIG. 6 is a simplified timing diagram illustrating an example of a trace variable that may be maintained at a neuron according to an example.

FIG. 6 is a simplified timing diagram illustrating an example of a trace variable 602, which may be maintained at a neuron, as a function of time t, according to an example use case. For the sake of simplicity and ease of illustration, trace variable 602 is depicted as a continuous function over time periods T1-T9, though in a practical embodiment, each time period T1-T9 may contain 50-100 actual discrete time increments, and the value of trace variable 602 would remain constant for the duration of each individual time step.

Input stimuli 604A, 604B, and 604C (collectively referenced as input events 604) are shown as impulses, which may be pre-synaptic spikes at the input or post-synaptic spikes at the output of the neuron. Input events 604 may vary in their weighting in some implementations. Each input stimulus 604A-604C causes a response in the neuron that affects the trace variable 602. In the example depicted, each input stimulus causes a step change in the positive direction, indicated at 606A, 606B, and 606C, followed by an exponential decay as indicated at 608A, 608B, and 608C. The exponential decay 608 follows an exponential curve that may be defined with a time constant τ, which is implemented by a filtering function.

In some embodiments, a temporal sequence of input events 604, including historical data, is itself stored as a trace. This feature is applicable to pre-synaptic and post-synaptic events, which may be stored separately, as distinct traces. In a related embodiment, where different types of input events may be used concurrently (e.g., having different characteristics to elicit different responses by the neuron) as pre-synaptic events, or as post-synaptic events.

Figure 7:
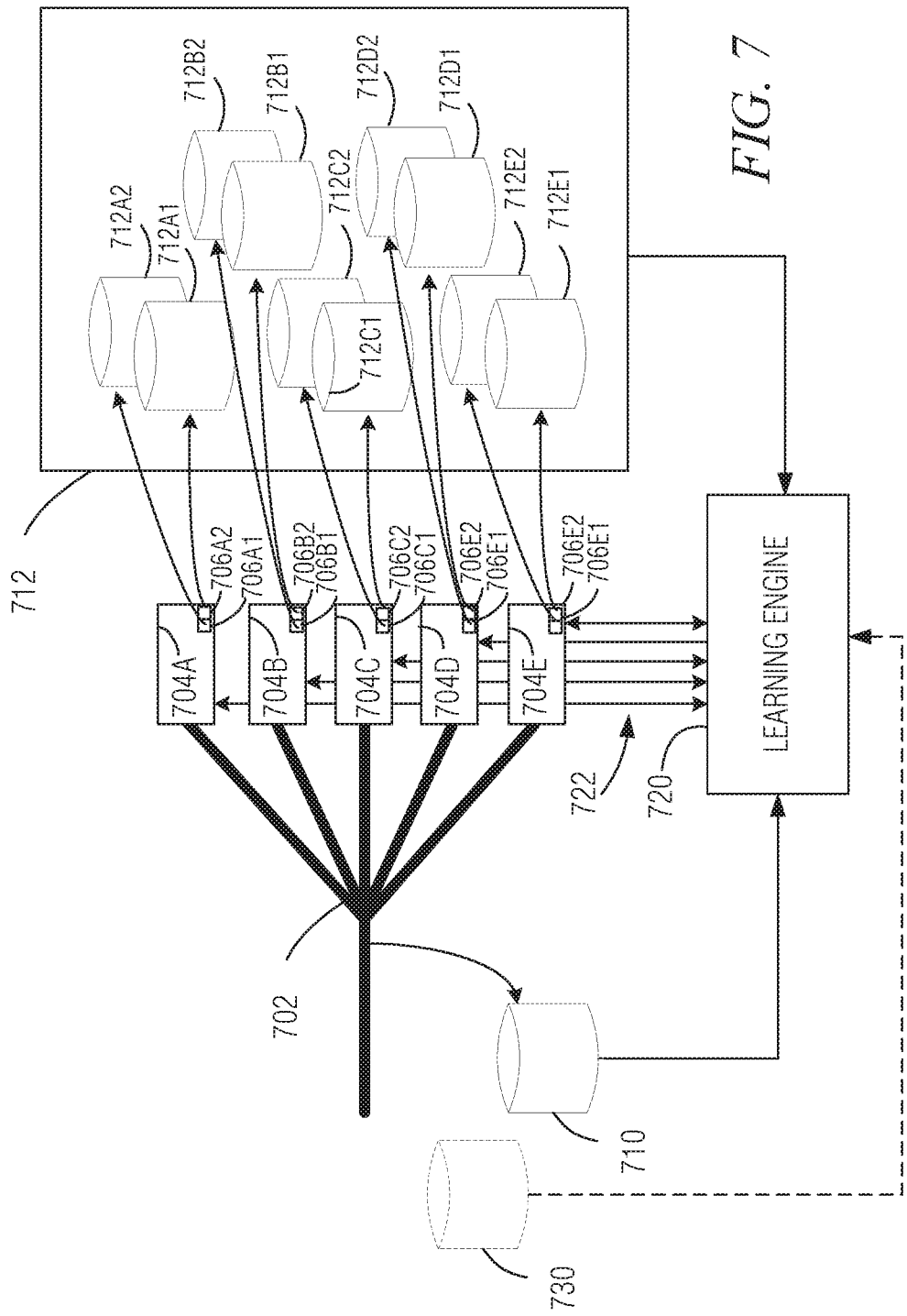
FIG. 7 is a high-level block diagram illustrating a portion of a neural network core architecture according to some embodiments.

FIG. 7 is a high-level block diagram illustrating a portion of a neural network core architecture according to some embodiments. Input axon 702, which may be the only one, or one of a plurality, of input axons to the core, fans out to a group of neurons 704A-704E. Accordingly, input axon 702 is common to neurons 704A-704E. In particular, input axon 702 may feed into each synapse to carry pre-synaptic signaling to the neurons 704A-704E. As an example, the pre-synaptic signaling carried by input axon 702 may indicate a destination dendritic compartment 706A1-E2, such that individual input events such as spikes may be uniquely directed to particular individual compartments. Each neuron 704A-704E includes one or more dendritic compartments. As illustrated, dendritic compartments 706A1 and 706A2 are associated with neuron 704A. Similarly, dendritic compartments 706B1 and 706B2 are associated with neuron 704B. In like fashion, dendritic compartments 706C1 and 706C2 are associated with neuron 704C; compartments 706D1 and 706D2 are associated with neuron 704D, and compartments 706E1 and 706E2 are associated with neuron 704E. Notably, each neuron 704 may have only a single dendritic compartment, or it may have a greater plurality of dendritic compartments.

Input axon 702 is associated with input data store 710. For instance, each input event carried by input axon 702 is passed to input data store 710, where it is stored as part of an input trace. The input trace in this example represents a filtered temporal sequence of pre-synaptic state variables (e.g., input spikes) accessible by the neurons 704A-704E. The filtered temporal sequence may be represented as a time series data set. In an example, each entry in the input trace consists of a pointer to the applicable synapse's memory, and a data structure (e.g., list) of trace variables. The data structure may additionally contain a field identifying parameters of the trace function, such as time constants and a spike impulse magnitude.

Each dendritic compartment 706 is associated with a corresponding compartment-specific data store 712. Thus, dendritic compartments 706A1-706E2 are respectively associated with compartment-specific data stores 712A1-712E2. Each compartment-specific data store 712 stores an output trace representing a filtered temporal sequence of post-synaptic state variables generated by the corresponding container 706.

Learning engine 720 reads the input trace(s) from input data store 710 and the output traces from compartment-specific data stores 712A1-712E2, and applies one or more learning rules in response to the pre-synaptic and post-synaptic events represented by the input and output traces to generate adjustments 722 for the synapses and compartments 7041706 associated with the pre- and post-synaptic traces. Each adjustment may be a change in weighting, time delay, or other parameter, for the neuron to apply to its input stimulus, for example. In a related example, the adjustment may add, remove, or modify a tag associated with a neuron. Learning engine 720 may be realized with a STDP engine according to some embodiments.

In an example embodiment, learning engine 720 utilizes the input trace to reconstruct the trace value state at the input axon in response to synaptic or post-synaptic delay, if any.

In a related type of embodiment, signaling for reinforcement learning is handled in the same framework as input stimulation signaling. Reinforcement learning of this type may include reward signals representing positive reinforcement, and punishment signals representing negative reinforcement. Reinforcement-learning signals may be processed in an event-driven manner similar to input spikes. The learning rules applied by the learning engine may reference reward traces and may depend on reward spike arrival. As an example, a small number of a core's input axons may be allocated for reward/punishment communication channels. Other input axons are configured to select one of the reward channels for use in their learning operations. The learning rules associated with an axon may reference reward values that have limited localized scoping over a core's synapses.

As illustrated in FIG. 7, reinforcement-learning data store 730 may be utilized as a type of, or in addition to, input data store 710 if the input axon is a dedicated reward axon. The spike messages that map to a core's reward axons may carry a graded reward/punishment value, e.g., 8 bits. In some embodiments, this signal grading may differ from standard spike messaging that typically only contains an axon_id address and no data. Reinforcement-learning signals received via a core's reward axons may be added to a reinforcement-learning data store that maintains one or more reinforcement-learning traces, each of which represents a temporal sequence of reinforcement-learning (e.g., reward, punishment) state variables. As part of its operation, learning engine 720 may read, process, and adjust, the reinforcement-learning signaling according to applicable learning rules.

Figure 8:
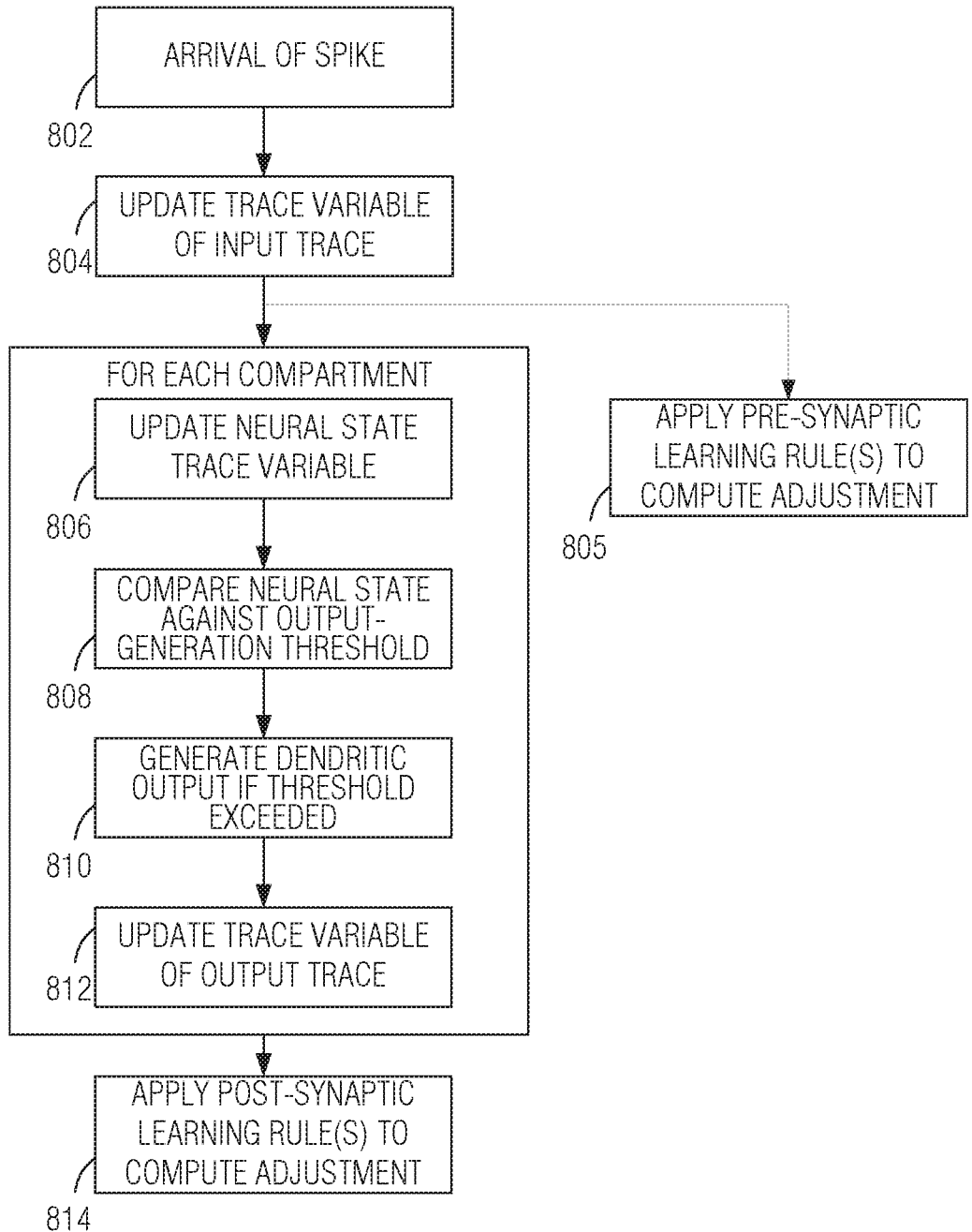
FIG. 8 is a process flow diagram illustrating an example embodiment that augments the inference-only flow depicted in FIG. 2 with the added operations used for supporting learning in the core.

FIG. 8 is a process flow diagram illustrating an example embodiment that augments the inference-only flow depicted in FIG. 2 with the added operations used for supporting learning in the core. The process illustrated in FIG. 8 represents operations for each individual input axon of a greater system having a number of input axons. At 802, a spike arrives via the input axon. At 804, the trace variable of the input trace associated with the input axon is updated in response to the spike. At 805, the learning engine applies learning rules based on the input and output traces as a result of the pre-synaptic spike and all parameters of the input axon's synaptic fanouts are adjusted. This event-driven approach provides some computational efficiency in that the trace variables are not updated in each and every time step. In a related embodiment, the updating of the trace variables is performed in response to passing of a preconfigured time duration, in which case only the spike time will be recorded in the input axon's trace entry on the spike's arrival.

Operations 806-812 are repeated for each dendritic compartment. At 806, the neural state trace variable, as managed by the corresponding compartment, is updated at the appropriate future service time in response to the input spike. At 808, the dendritic compartment compares the neural state against an output-generation threshold. If the threshold is exceeded, a corresponding dendritic output, such as an output spike, is generated. At 812 a trace variable of the output trace is updated to account for the generation of the output spike. At 814, the learning engine applies learning rules based on the input and output traces as a result of the post-synaptic spike, to determine whether, and to what extent, any adjustment is to be made to the configuration of the compartment's fanin synapses. As an example, the types of parameters that may be subject to adjustment include the synaptic weight, the synaptic delay, and a synaptic tag.

A variety of learning rules may be triggered in an event-driven fashion in response to a pre-synaptic spike appearing at the input axon of a core, or whenever a post-synaptic spike occurs (e.g., a compartment firing within the core). Since trace state is stored per pre-synaptic axon and per post-synaptic compartment, these events may call for mapping the spike events either in the forward direction—to a pre-synaptic axon's synapse fan-outs, or in the backwards direction—to a post-synaptic compartment's fan-in synapses.

In some implementations, the forward lookup uses a forward-mapping data structure that associates each of the pre-synaptic input axon's fan-outs with dendritic compartments that are responsive to stimuli arriving on the input axon. In related implementations, a backward-mapping data structure is provided that maps each post-synaptic compartment to its list of pre-synaptic fan-in axons. The backward-mapping data stores the inverse of the forward-mapping data structures (synapse map 32 and synapse cfg 34 memories—see FIG. 1) but with much reduced associated data per synapse.

Figure 9:
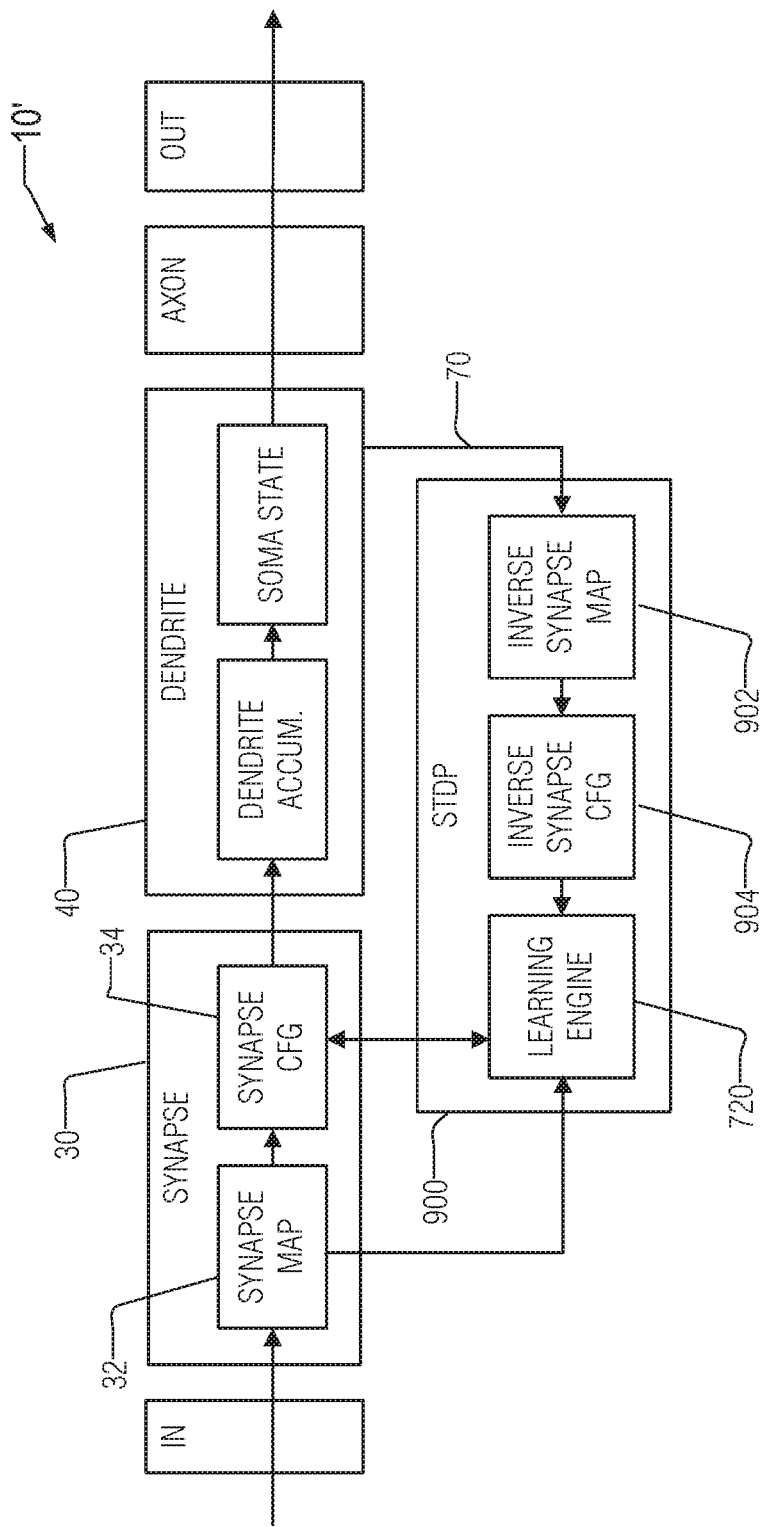
FIG. 9 is a diagram illustrating an example neural core structure in greater detail to expand upon the example neural core structure depicted in FIG. 1.

FIG. 9 is a diagram illustrating an example neural core structure 10', in greater detail to expand upon the example neural core structure 10 depicted in FIG. 1, with additional detail shown for STDP engine 900. As depicted, STDP engine 900 includes learning engine 720 (described above with reference to FIG. 7), along with inverse synapse map 902 and inverse synapse cfg memory 904. The inverse synapse cfg memory 904 may contain static, binary connectivity properties comprising one bit per synapse, for instance. In some configurations, it may additionally specify one bit per synapse to indicate whether learning is enabled on a particular synapse (or this bit may be specified per synaptic list in a manner similar to the forward mapping pathway.)

In some embodiments, using these mapping pathways, learning rules may be applied by learning engine 720 in an event-driven fashion whenever an input axon receives a spike or a soma compartment spikes, where a spike on either side activates its corresponding forward or reverse lookup pathways.

In some embodiments, not all learning-related operations may be executed in a fully event-driven manner. For some synaptic learning models, for example heterosynaptic decay, a class of learning rules may be applied unconditionally on all nonzero trace variables, ideally in a continuous manner on every time step. Such learning rules, for implementations that may support them, call for reading the trace store state of every learning-enabled input axon and dendritic compartments. The learning rules must be applied to any trace variables that are nonzero, resulting in, at minimum, a forward lookup to obtain the synaptic parameters to modify, followed by a write back of the modified parameters.

Similar to unconditional learning rules, trace variables themselves in theory may be updated on every time step according to some smoothing function, such as exponential filtering. If a spike arrives on a particular time step, an additive impulse amount is added to the value of the trace variable; if not, it is decayed in some manner, usually as a multiplicative scaling. In either case, the variable may be subject to modification at every time step.

In an example embodiment, to reduce the performance and energy cost of such unconditional operations that ideally occur at every time step, these unconditional updates are applied on a less frequent but periodic basis, which is referred to in the present context as a learning epoch. In practice, unconditional learning rules typically apply to long time scales and do not lose any appreciable accuracy by applying them on a periodic-epoch basis. With the appropriate optimizations and approximations, trace variables may be decayed from epoch to epoch with a significant reduction in performance and energy cost, even for relatively short epoch times of 4 or 8 time steps. Moreover, because one function of the learning engine is to dynamically adapt to real-world data that is inherently noisy and often statistical in nature, stochastic computations may be employed, such as stochastic rounding, that permit these periodic calculations to be performed with significantly reduced bit precision, thereby saving additional energy and computation time.

In some embodiments, the learning architecture described herein is particularly amenable to stochastic trace computations because of the repeated calculations over time; stochastic errors tend to average with decreasing variance as more random samples are taken.

In some cases, the backward-mapping data structures used in the STDP process may cost too much in terms of size and may therefore be omitted. To accommodate such a variation in the architecture, a spike replay technique may be applied in accordance with some embodiments. On every learning epoch, forward lookups are performed on all learning-enabled axons, whether they have fired recently or not. In one approach, as a result of associated product terms in the learning rules, lookups on axons whose trace variables have decayed to zero may be skipped, although this may not always be possible.

The learning rules associated with the post-synaptic compartment fan-outs of each axon's lookup are then evaluated so any post-synaptic spikes that occurred within the learning epoch may be detected. Since the post-synaptic compartment may have spiked at some time in the past, up to the beginning of the learning epoch, applying the learning rules generally requires adjusting the pre-synaptic trace variables to the appropriate past post-synaptic spike time. This trace calculation may be intrinsically performed since, due to the epoch-based trace optimization as described above, the trace variables are being advanced to the end of the learning epoch in the same operation, so both older and newer values of the trace variables are known, and all intermediate values may be calculated.

Further expanding the role of the replay technique, even pre-synaptic learning events may be delayed to the learning epoch operations. Given that the pre-synaptic trace variables may be both updated from epoch to epoch as well as correlated to any post-synaptic spike times (of which there may be many due to the axon's fanout), it may be advantageous to also handle the pre-synaptic spike learning events in a delayed fashion during the learning epoch update phase.

Furthermore, in some embodiments, in order to support learning on synapses with delays, the periodic epoch-based pre-synaptic learning approach is instituted.

In a related embodiment, a variety of configuration settings may be used to terminate the replay lookup mechanism as early as possible to save power and improve performance. For example, if all post-synaptic fan-out rules of a particular pre-synaptic axon depend on the pre-synaptic trace variables being nonzero, then the replay mechanism will abort the forward lookup if the axon's trace variables are zero.

Figure 10:
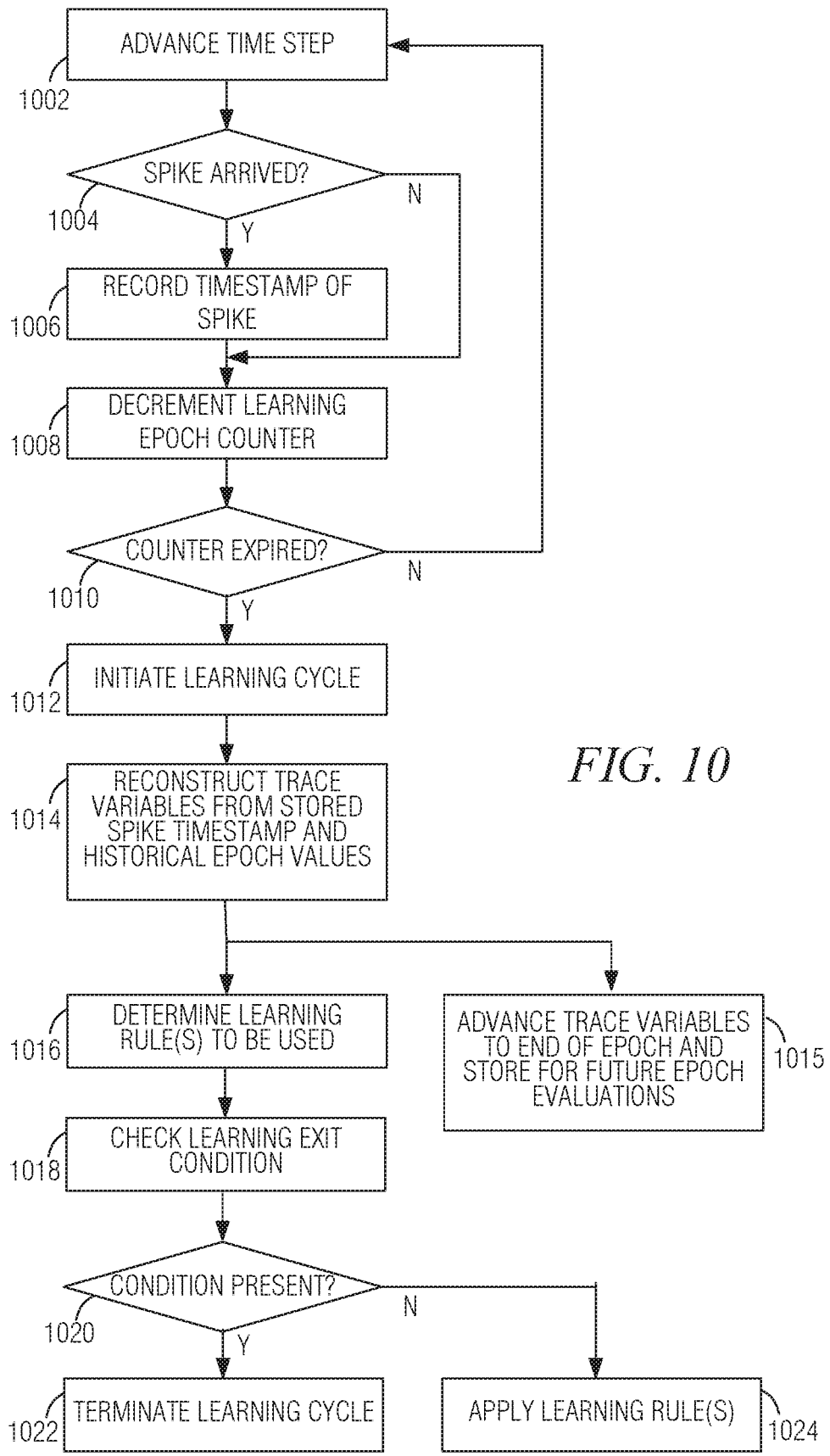
FIG. 10 is a flow diagram illustrating an example process of initiating and performing a learning cycle in a neural network according to some embodiments.

FIG. 10 is a flow diagram illustrating an example process of initiating and performing a learning cycle in a neural network according to some embodiments. The process may be performed per each input axon. At 1002, the system advances to the next time step. At 1004 the process determines whether a spike has arrived in the current or previous time step. In the event of a spike, the timestamp of the spike is recorded at 1006.

Notably, in this example, the arrival of the spike does not immediately cause the system to perform a learning cycle. Instead, the learning cycle is performed according to a learning epoch timing scheme as described above. In the process of FIG. 10, the learning epoch is implemented with a learning epoch counter. The counter may be set to a value that is expected under most conditions to expire before a next spike arrives. This scheme assumes that spiking is a relatively sparse event. For example, the epoch counter may be set to a value of 8, 16, 40 time steps, or to some other arbitrary value. The input axon trace data store 710 (FIG. 7) and output dendrite trace data store 712 may be provisioned to record at most one spike arrival during the learning epoch. It is possible that an occasional second spike will occur before the expiration of the learning epoch counter, in which case that second spike may constitute noise in the system's learning process.

At 1008, the learning epoch counter is decremented. Decision 1010 checks if the counter has expired. In the negative case, the process loops back to advancing to the next time step without performing any learning operations. In the positive case, the process advances to 1012, where the learning cycle is initiated. In the learning cycle, at 1014, the trace variables are reconstructed from the timestamp of any received spike since the last learning cycle along with the stored values of the trace variables as of the beginning of the learning epoch. i.e. end of the prior epoch.

In the epoch-based architecture according to some examples, synaptic delays may complicate the pre-synaptic trace variable computation since trace variable state is stored by axon, not by synapse. In order to evaluate the learning rules of an axon with two synaptic fanouts, one with delay 0, the other with delay 16, two pre-synaptic trace values are computed, one corresponding to the trace value of the axon 16 time steps before the other. This may call for storing multiple epochs of historical trace samples per axon, depending on the maximum synaptic delay value over all synapses of a given axon. In an illustrative example, a learning epoch interval of 16 time steps calls for one additional trace value to be stored (corresponding to the case that $t_{post}=0$ relative to the beginning of the current learning epoch for the delayed synapse, such that the trace value of the input axon is 16 time steps, or one epoch, whichever is earlier). A learning epoch interval of 8 time steps would call for storing two additional historical trace values. Each historical trace sample comprises both a trace value and a spike time offset within that epoch. The portion of the trace prior to the spike may be reconstructed using the beginning-of-epoch value as the initial trace value, while the portion of the trace that follows the spike in that epoch may be adjusted to include an additive impulse at the time of the spike arrival in the historical epoch. In general, in order to support a maximum synaptic delay of $D_{max}$, with a learning epoch time of $T_{epoch}$, ceil $$\left(\frac{D_{max}}{T_{epoch}}\right)$$

historical trace samples may need to be stored in the input axon trace data store 410, in addition to the baseline trace state value at the beginning of the core's current epoch.

At 1016, the learning engine determines which learning rule or rules should be used. In one type of embodiment, the learning engine is preconfigured with a set of different learning programs, denoted profiles, that are referenced by index value. The set of learning profiles may be stored in a learning-rule data store, which is indexed via the profile index in the learning engine, for example. Each input axon, dendritic compartment, synaptic entry format, neuron, or core, may be configured to specify the learning profile index to apply to the pre- or post-synaptic learning events in which it participates. In operation 1016, the learning engine may look up the applicable rule(s) based on the source(s) of the event(s) or implicitly based on its association with a core or neuron. In one embodiment, all profile indices as provided by the various input axons, dendritic compartments, synaptic entry formats, or other structures involved in the learning evaluation may be added together to obtain a final profile index used in the rule lookup. This provides a way to specify the learning profile in a number of different places in the core, depending on the nature of the rules, with a minimum of configuration overhead.

Placement of the learning rules in the learning-rule data store facilitates programmability of the learning engine. Learning rules comprise a sequence of microcode operations, and different rules may specify fewer or more microcode operations than others. The learning-rule data store, indexed by profile index, allows the different rules to a share a common pool of data store resources efficiently. In another embodiment, an additional level of indirection may be applied to map a learning-rule data store address from the profile index, rather than using the profile index directly, thereby alleviating a constraint on the profile index assignments. Notably, more than one learning rule may be applied in a given learning cycle.

At 1018, the learning engine checks the learning exit condition to determine whether a condition is present (e.g., based on the trace variables) that obviates any further execution of the learning cycle. For example, the learning engine may compare the pre-synaptic or post-synaptic state variables against zero, and proceed only if either is nonzero, or only if both are nonzero, depending on what the learning profile specifies. In response to decision 1020, the learning cycle may be terminated at 1022 if the exit condition is present. Otherwise, the learning rule(s) are applied at 1024.

In some embodiments, the learning engine implements a sum-of-products semantic for learning rules. For instance, the computation f(Z) given by:

$$Z' = f(Z) = Z + \sum_{i=1}^{N_P} S_i \cdot P_i = Z + \sum_{i=1}^{N_P} S_i \prod_{j=1}^{n_i} T_{i,j} = Z + \sum_{i=1}^{N_P} S_i \prod_{j=1}^{n_i} (V_{i,j} + C_{i,j})$$

may be invoked where $P_i$ is a product series comprising $n_i$ product terms, each $V_{i,j}$ is any input variable available to the STDP computation (a synaptic input, spike notification Boolean, or trace variable), $C_{i,j}$ is a constant additive offset from the profile microcode (usually zero), and $S_i$ is a per-product scale factor. $Z'$ denotes the new value of the synaptic value $Z$ that will be written back to a neuron configuration data store denoting weighting factor, delay, or tag information to be used in processing input spikes by the neuron.

In an example embodiment, each learning profile defines a set of such functions ($f_W$, $f_D$, $f_T$), one for weight, delay, and tag respectively, that are collectively referred to as the profile's learning rule. By default, each function is the identity, and typically a profile will only define one to something other than the identity. Not shown in the sum-of-products equation is a dependency defined for each product series $P_i$. A product belongs to one of four dependency classes, which controls when it is evaluated (i.e. its exit condition, if not satisfied) and what specific variables $V_{i,j}$ are used:

TABLE 2

| $P_i$ dependency | Notation | Exit Condition (mapped to 0) | Trace variables used |
|---|---|---|---|
| Presynaptic | $P_X$ | 0 if no presynaptic spike | $X(t_{pre})$, $Y(t_{pre})$, $R(t_{epoch})$ |
| Postsynaptic | $P_Y$ | 0 if no postsynaptic spike | $X(t_{post})$, $Y(t_{post})$, $R(t_{epoch})$ |
| Reward | $P_R$ | 0 if no reward spike | $X(t_{epoch})$, $Y(t_{epoch})$, $R(t_{epoch})$ |
| Unconditional | $P_U$ | $\lfloor t_{epoch}/T_{update} \rfloor \bmod N_{decimate} \neq 0$ | $X(t_{epoch})$, $Y(t_{epoch})$, $R(t_{epoch})$ |

Example Dependency Classes

In Table 2, presynaptic trace variables are shown as X, post-synpatic trace variables are shown as Y, and reward trace variables are shown as R. In general, these are vectors over some number of trace types per axon, compartment, or reward axon. Below, the subscripts on these x, y, or r variables indicate the components of their associated trace vectors. By convention the 0 subscript indicates the unfiltered spike impulse response, e.g., $x_0(t)=0$ if no spike occurred on the input axon at time step t; $x_0(t)=1$ otherwise. The time values $t_{pre}$ and $t_{post}$ correspond to the times of a pre-synaptic spike and a post-synaptic spike within the last epoch, respectively. The $t_{epoch}$ time corresponds to the end-of-epoch time step.

Table 3 below lists some examples of supported variables and product term forms, where C is an optional 8b signed constant, specified by the profile, that is added to the specified variable. Since the bit width of WGT and TAG exceeds 8b, for those variables, C is left-shifted by 1 prior to adding.

TABLE 3

| # | T | Bits | |
|---|---|---|---|
| 0 | $x_0 + C$ | 1b (U) | Presynaptic spike |
| 1 | $x_1 + C$ | 7b (U) | $1^{st}$ presynaptic trace |
| 2 | $x_2 + C$ | 7b (U) | $2^{nd}$ presynaptic trace |
| 3 | $x_0 + C$ | 1b (U) | Postsynaptic spike |
| 4 | $x_1 + C$ | 7b (U) | $1^{st}$ postsynaptic trace |
| 5 | $x_2 + C$ | 7b (U) | $2^{nd}$ postsynaptic trace |
| 6 | $x_3 + C$ | 7b (U) | $3^{rd}$ postsynaptic trace |
| 7 | $r_0 + C$ | 1b (U) | Reward spike |
| 8 | $r1 + C$ | 8b (S) | Reward trace |
| 9 | $Wgt + 2 \cdot C$ | 9b (S) | Synaptic weight |
| 10 | $Dly + C$ | 6b (U) | Synaptic delay |
| 11 | $Tag + 2 \cdot C$ | 9b (S) | Synaptic tag |
| 12 | $Sgn(Wgt + 2 \cdot C)$ | 1b (S) | Sign of case 9 (+/−1) |
| 13 | $Sgn(Dly + C)$ | 1b (S) | Sign of case 10 (+/−1) |
| 14 | $Sgn(Tag + 2 \cdot C)$ | 1b (S) | Sign of case 11 (+/−1) |
| 15 | C | 8b (S) | Constant term (AddConst==1) |
| 15 | $S_m \cdot 2^{Se}$ | 4b (S) | Scaling term. 4b mantissa, 4b exponent. (AddConst==0) |

Example Supported Variables and Product Term Forms

FIG. 11 lists various examples of learning rules, including pairwise STDP, Triplet STDP with heterosynaptic decay, Distal Reward with Synaptic Tags, Delay STDP, and E-STDP with dynamic weight consolidation. Each example first provides the time-domain equation that defines the learning rule in terms of constants (e.g. $A_+$, $B_1$, $w_\theta$), trace variables such as $y_0(t)$, and synaptic variables (W for weight, T for tag, D for delay). Next, the rule is expressed in the sum-of-products form compatible with one embodiment of the learning engine, where all scaling constants are denoted as $S_i$, constant offsets given as $C_i$ or literals, and product series represented as $P_D(T_1, T_2, \ldots)$ where $T_i$ are the terms in the product series with dependency D as defined in Table 2.

Some of the examples in FIG. 11 illustrate the use of the synaptic tag parameter (T) that may be optionally included in the synaptic entries of an axon's fanouts. These tag parameters serve as auxiliary dynamic state variables for use in complex learning rules such as those shown in these examples. Synaptic tags have no effect during spike handling (inference phase) but may contribute to more desirable weight modification dynamics, such as to record reinforcement learning eligibility trace state or to serve as an inertial anchor for a weight variable to prevent it from changing too quickly in response to noisy network inputs.

Additional Notes and Examples

Example 1 is a neuromorphic computing apparatus comprising: computing hardware, including processing and data storage circuitry; a network of spiking neural network cores implemented in the computing hardware, each core including an input axon and a plurality of neurons, including synapses, wherein the input axon is common to plurality of neurons; wherein the input axon is associated with an input data store to store an input trace representing a time series of pre-synaptic spike events that are filtered according to a filtering function, and accessible by the synapses of the plurality of neurons of the core; wherein each one of the plurality of neurons includes at least one dendritic compartment to store and process variables representing a dynamic state of the neuron, and wherein the at least one dendritic compartment is associated with a compartment-specific data store to store an output trace representing a time series of post-synaptic spike events that are filtered according to a filtering function; and wherein each one of the plurality of neurons includes a learning engine to apply a set of one or more learning rules based on the pre-synaptic and post-synaptic spike events to produce an adjustment of parameters of a corresponding synapse to those spike events.

In Example 2, the subject matter of Example 1 optionally includes wherein the input data store is to store a plurality of input traces.

In Example 3, the subject matter of Example 2 optionally includes wherein the plurality of input traces correspond to different time scales over which the input spike events are filtered.

In Example 4, the subject matter of any one or more of Examples 1-3 optionally include wherein the compartment-specific data store associated with each of the at least one compartment is to store a plurality of output traces.

In Example 5, the subject matter of Example 4 optionally includes wherein the plurality of output spike events of each of the at least one compartment correspond to different time scales over which the output spike events of that compartment are filtered.

In Example 6, the subject matter of any one or more of Examples 1-5 optionally include wherein the learning engine includes a spike timing-dependent plasticity (STDP) engine.

In Example 7, the subject matter of any one or more of Examples 1-6 optionally include wherein the input axon is a dedicated reward axon responsive to reinforcement-learning signaling, and wherein the learning engine is to read, process, and adjust, the reinforcement-learning signaling according to applicable learning rules.

In Example 8, the subject matter of Example 7 optionally includes wherein the reinforcement-learning signaling represents graded spike values.

In Example 9, the subject matter of any one or more of Examples 1-8 optionally include wherein the input axon is associated with a reinforcement-learning data store that stores at least one reinforcement-learning trace representing a temporal sequence of reinforcement-learning state variables.

In Example 10, the subject matter of any one or more of Examples 1-9 optionally include wherein the adjustment of the parameters of the corresponding synapse includes at least one adjustment selected from among: weighting adjustment, delay adjustment, tag adjustment, or any combination thereof.

In Example 11, the subject matter of any one or more of Examples 1-10 optionally include wherein the learning engine is to access a forward-mapping data structure that associates fan-outs of the input axon with dendritic compartments that are responsive to stimuli arriving on the input axon.

In Example 12, the subject matter of any one or more of Examples 1-11 optionally include wherein the learning engine is to access a backward-mapping data structure that associates each dendritic compartment to a corresponding set of fan-in input axons.

In Example 13, the subject matter of any one or more of Examples 1-12 optionally include wherein the learning engine is to perform a learning cycle in response to a predefined passage of time steps, wherein the predefined passage of time steps represents a learning epoch.

In Example 14, the subject matter of Example 13 optionally includes wherein the input data store maintains historical values of the input trace, including time offsets of the pre-synaptic spike events, over a set of prior epochs, to facilitate historic reconstruction of the input trace.

In Example 15, the subject matter of Example 14 optionally includes wherein the historical values of the input trace are used to compute trace values for a current epoch at fanout synapses with nonzero network delay.

In Example 16, the subject matter of any one or more of Examples 13-15 optionally include wherein the input data store and each trace-specific data store update their stored traces only once per learning epoch except to record any spike event occurrences within the learning epoch.

In Example 17, the subject matter of any one or more of Examples 13-16 optionally include wherein the learning engine applies learning rules unconditionally in response to passage of a predefined number of learning epochs.

In Example 18, the subject matter of any one or more of Examples 1-17 optionally include wherein the learning engine is programmable to access a plurality of different learning rule profiles.

In Example 19, the subject matter of any one or more of Examples 1-18 optionally include wherein the learning engine is programmable to apply a plurality of learning rules.

In Example 20, the subject matter of any one or more of Examples 1-19 optionally include wherein the learning engine is to compare the pre-synaptic or post-synaptic state variables against a learning exit condition, wherein upon satisfaction of the learning exit condition, the learning engine is to terminate a learning operation.

In Example 21, the subject matter of any one or more of Examples 1-20 optionally include wherein the learning engine is to apply learning rules that are expressed as a sum-of-products semantic, with each product comprising a programmable series of trace values, synaptic parameters, and constants available to the learning engine.

In Example 22, the subject matter of any one or more of Examples 1-21 optionally include wherein each neuron includes: an input to accept pre-synaptic signaling from an input axon associated with the neuromorphic core; a synapse to store and distribute input and feedback signaling for processing, the synapse including a set of pre-synaptic terminals; and an output to carry post-synaptic signaling from the neuron to other neurons.

Example 23 is a method for operating a neuromorphic computing system, the method being executed by computing hardware, and comprising: configuring a network of spiking neural network cores in the computing hardware, each core including an input axon and a plurality of neurons, including synapses, wherein the input axon is common to plurality of neurons; associating the input axon with an input data store to store an input trace representing a time series of pre-synaptic spike events that are filtered according to a filtering function, and accessible by the synapses of the plurality of neurons of the core; providing each one of the plurality of neurons with at least one dendritic compartment to store and process variables representing a dynamic state of the neuron; associating the at least one dendritic compartment with a compartment-specific data store to store an output trace representing a time series of post-synaptic spike events that are filtered according to a filtering function; and for each one of the plurality of neurons, applying a set of one or more learning rules based on the pre-synaptic and post-synaptic spike events to produce an adjustment of parameters of a corresponding synapse to those spike events.

In Example 24, the subject matter of Example 23 optionally includes wherein the input data store is to store a plurality of input traces.

In Example 25, the subject matter of Example 24 optionally includes wherein the plurality of input traces correspond to different time scales over which the input spike events are filtered.

In Example 26, the subject matter of any one or more of Examples 23-25 optionally include wherein the compartment-specific data store associated with each of the at least one compartment is to store a plurality of output traces.

In Example 27, the subject matter of Example 26 optionally includes wherein the plurality of output spike events of each of the at least one compartment correspond to different time scales over which the output spike events of that compartment are filtered.

In Example 28, the subject matter of any one or more of Examples 23-27 optionally include wherein the learning rules include a spike timing-dependent plasticity (STDP) modeling.

In Example 29, the subject matter of any one or more of Examples 23-28 optionally include wherein the input axon is a dedicated reward axon responsive to reinforcement-learning signaling, and further comprising: reading, processing, and adjusting, the reinforcement-learning signaling according to applicable learning rules.

In Example 30, the subject matter of Example 29 optionally includes wherein the reinforcement-learning signaling represents graded spike values.

In Example 31, the subject matter of any one or more of Examples 23-30 optionally include wherein the input axon is associated with a reinforcement-learning data store that stores at least one reinforcement-learning trace representing a temporal sequence of reinforcement-learning state variables.

In Example 32, the subject matter of any one or more of Examples 23-31 optionally include wherein the adjustment of the parameters of the corresponding synapse includes at least one adjustment selected from among: weighting adjustment, delay adjustment, tag adjustment, or any combination thereof.

In Example 33, the subject matter of any one or more of Examples 23-32 optionally include accessing a forward-mapping data structure that associates fan-outs of the input axon with dendritic compartments that are responsive to stimuli arriving on the input axon.

In Example 34, the subject matter of any one or more of Examples 23-33 optionally include accessing a backward-mapping data structure that associates each dendritic compartment to a corresponding set of fan-in input axons.

In Example 35, the subject matter of any one or more of Examples 23-34 optionally include performing a learning cycle in response to a predefined passage of time steps, wherein the predefined passage of time steps represents a learning epoch.

In Example 36, the subject matter of Example 35 optionally includes wherein the input data store maintains historical values of the input trace, including time offsets of the pre-synaptic spike events, over a set of prior epochs, to facilitate historic reconstruction of the input trace.

In Example 37, the subject matter of Example 36 optionally includes wherein the historical values of the input trace are used to compute trace values for a current epoch at fanout synapses with nonzero network delay.

In Example 38, the subject matter of any one or more of Examples 35-37 optionally include wherein the input data store and each trace-specific data store update their stored traces only once per learning epoch except to record any spike event occurrences within the learning epoch.

In Example 39, the subject matter of any one or more of Examples 35-38 optionally include applying learning rules unconditionally in response to passage of a predefined number of learning epochs.

In Example 40, the subject matter of any one or more of Examples 23-39 optionally include wherein applying a set of one or more learning rules includes accessing a plurality of different learning rule profiles.

In Example 41, the subject matter of any one or more of Examples 23-40 optionally include wherein applying a set of one or more learning rules includes applying a plurality of different learning rules.

In Example 42, the subject matter of any one or more of Examples 23-41 optionally include comparing the pre-synaptic or post-synaptic state variables against a learning exit condition; and upon satisfaction of the learning exit condition, terminating a learning operation.

In Example 43, the subject matter of any one or more of Examples 23-42 optionally include applying learning rules that are expressed as a sum-of-products semantic, with each product comprising a programmable series of trace values, synaptic parameters, and constants.

In Example 44, the subject matter of any one or more of Examples 23-43 optionally include wherein each neuron is configured to include: an input to accept pre-synaptic signaling from an input axon associated with the neuromorphic core; a synapse to store and distribute input and feedback signaling for processing, the synapse including a set of pre-synaptic terminals; and an output to carry post-synaptic signaling from the neuron to other neurons.

Example 45 is at least one machine-readable medium containing instructions that, when executed by computing hardware, cause the computing hardware to perform the method according to any one of Examples 23-44.

Example 46 is a neuromorphic computing system comprising means for performing the method according to any one of Examples 23-44.

Example 47 is a at least one machine-readable medium containing instructions that, when executed by computing hardware, cause the computing hardware to perform: configuring a network of spiking neural network cores in the computing hardware, each core including an input axon and a plurality of neurons, including synapses, wherein the input axon is common to plurality of neurons; associating the input axon with an input data store to store an input trace representing a time series of pre-synaptic spike events that are filtered according to a filtering function, and accessible by the synapses of the plurality of neurons of the core; providing each one of the plurality of neurons with at least one dendritic compartment to store and process variables representing a dynamic state of the neuron; associating the at least one dendritic compartment with a compartment-specific data store to store an output trace representing a time series of post-synaptic spike events that are filtered according to a filtering function; and for each one of the plurality of neurons, applying a set of one or more learning rules based on the pre-synaptic and post-synaptic spike events to produce an adjustment of parameters of a corresponding synapse to those spike events.

In Example 48, the subject matter of Example 47 optionally includes wherein the input data store is to store a plurality of input traces.

In Example 49, the subject matter of Example 48 optionally includes wherein the plurality of input traces correspond to different time scales over which the input spike events are filtered.

In Example 50, the subject matter of any one or more of Examples 47-49 optionally include wherein the compartment-specific data store associated with each of the at least one compartment is to store a plurality of output traces.

In Example 51, the subject matter of Example 50 optionally includes wherein the plurality of output spike events of each of the at least one compartment correspond to different time scales over which the output spike events of that compartment are filtered.

In Example 52, the subject matter of any one or more of Examples 47-51 optionally include wherein the learning rules include a spike timing-dependent plasticity (STDP) modeling.

In Example 53, the subject matter of any one or more of Examples 47-52 optionally include wherein the input axon is a dedicated reward axon responsive to reinforcement-learning signaling, and further comprising instructions for reading, processing, and adjusting, the reinforcement-learning signaling according to applicable learning rules.

In Example 54, the subject matter of Example 53 optionally includes wherein the reinforcement-learning signaling represents graded spike values.

In Example 55, the subject matter of any one or more of Examples 47-54 optionally include wherein the input axon is associated with a reinforcement-learning data store that stores at least one reinforcement-learning trace representing a temporal sequence of reinforcement-learning state variables.

In Example 56, the subject matter of any one or more of Examples 47-55 optionally include wherein the adjustment of the parameters of the corresponding synapse includes at least one adjustment selected from among: weighting adjustment, delay adjustment, tag adjustment, or any combination thereof.

In Example 57, the subject matter of any one or more of Examples 47-56 optionally include instructions for accessing a forward-mapping data structure that associates fan-outs of the input axon with dendritic compartments that are responsive to stimuli arriving on the input axon.

In Example 58, the subject matter of any one or more of Examples 47-57 optionally include instructions for accessing a backward-mapping data structure that associates each dendritic compartment to a corresponding set of fan-in input axons.

In Example 59, the subject matter of any one or more of Examples 47-58 optionally include instructions for performing a learning cycle in response to a predefined passage of time steps, wherein the predefined passage of time steps represents a learning epoch.

In Example 60, the subject matter of Example 59 optionally includes wherein the input data store maintains historical values of the input trace, including time offsets of the pre-synaptic spike events, over a set of prior epochs, to facilitate historic reconstruction of the input trace.

In Example 61, the subject matter of Example 60 optionally includes wherein the historical values of the input trace are used to compute trace values for a current epoch at fanout synapses with nonzero network delay.

In Example 62, the subject matter of any one or more of Examples 59-61 optionally include wherein the input data store and each trace-specific data store update their stored traces only once per learning epoch except to record any spike event occurrences within the learning epoch.

In Example 63, the subject matter of any one or more of Examples 59-62 optionally include instructions for applying learning rules unconditionally in response to passage of a predefined number of learning epochs.

In Example 64, the subject matter of any one or more of Examples 47-63 optionally include wherein the instructions for applying a set of one or more learning rules include instructions for accessing a plurality of different learning rule profiles.

In Example 65, the subject matter of any one or more of Examples 47-64 optionally include wherein the instructions for applying a set of one or more learning rules include instructions for applying a plurality of different learning rules.

In Example 66, the subject matter of any one or more of Examples 47-65 optionally include instructions for comparing the pre-synaptic or post-synaptic state variables against a learning exit condition, and for terminating a learning operation upon satisfaction of the learning exit condition.

In Example 67, the subject matter of any one or more of Examples 47-66 optionally include instructions for applying learning rules that are expressed as a sum-of-products semantic, with each product comprising a programmable series of trace values, synaptic parameters, and constants.

In Example 68, the subject matter of any one or more of Examples 47-67 optionally include wherein each neuron is configured to include: an input to accept pre-synaptic signaling from an input axon associated with the neuromorphic core; a synapse to store and distribute input and feedback signaling for processing, the synapse including a set of pre-synaptic terminals; and an output to carry post-synaptic signaling from the neuron to other neurons.

Example 69 is a neuromorphic computing system comprising: means for configuring a network of spiking neural network cores in the computing hardware, each core including an input axon and a plurality of neurons, including synapses, wherein the input axon is common to plurality of neurons; means for associating the input axon with an input data store to store an input trace representing a time series of pre-synaptic spike events that are filtered according to a filtering function, and accessible by the synapses of the plurality of neurons of the core; means for providing each one of the plurality of neurons with at least one dendritic compartment to store and process variables representing a dynamic state of the neuron; means for associating the at least one dendritic compartment with a compartment-specific data store to store an output trace representing a time series of post-synaptic spike events that are filtered according to a filtering function; and means for for each one of the plurality of neurons, applying a set of one or more learning rules based on the pre-synaptic and post-synaptic spike events to produce an adjustment of parameters of a corresponding synapse to those spike events.

In Example 70, the subject matter of Example 69 optionally includes wherein the input data store is to store a plurality of input traces.

In Example 71, the subject matter of Example 70 optionally includes wherein the plurality of input traces correspond to different time scales over which the input spike events are filtered.

In Example 72, the subject matter of any one or more of Examples 69-71 optionally include wherein the compartment-specific data store associated with each of the at least one compartment is to store a plurality of output traces.

In Example 73, the subject matter of Example 72 optionally includes wherein the plurality of output spike events of each of the at least one compartment correspond to different time scales over which the output spike events of that compartment are filtered.

In Example 74, the subject matter of any one or more of Examples 69-73 optionally include wherein the learning rules include a spike timing-dependent plasticity (STDP) modeling.

In Example 75, the subject matter of any one or more of Examples 69-74 optionally include wherein the input axon is a dedicated reward axon responsive to reinforcement-learning signaling, and further comprising means for reading, processing, and adjusting, the reinforcement-learning signaling according to applicable learning rules.

In Example 76, the subject matter of Example 75 optionally includes wherein the reinforcement-learning signaling represents graded spike values.

In Example 77, the subject matter of any one or more of Examples 69-76 optionally include wherein the input axon is associated with a reinforcement-learning data store that stores at least one reinforcement-learning trace representing a temporal sequence of reinforcement-learning state variables.

In Example 78, the subject matter of any one or more of Examples 69-77 optionally include wherein the adjustment of the parameters of the corresponding synapse includes at least one adjustment selected from among: weighting adjustment, delay adjustment, tag adjustment, or any combination thereof.

In Example 79, the subject matter of any one or more of Examples 69-78 optionally include means for accessing a forward-mapping data structure that associates fan-outs of the input axon with dendritic compartments that are responsive to stimuli arriving on the input axon.

In Example 80, the subject matter of any one or more of Examples 69-79 optionally include means for accessing a backward-mapping data structure that associates each dendritic compartment to a corresponding set of fan-in input axons.

In Example 81, the subject matter of any one or more of Examples 69-80 optionally include means for performing a learning cycle in response to a predefined passage of time steps, wherein the predefined passage of time steps represents a learning epoch.

In Example 82, the subject matter of Example 81 optionally includes wherein the input data store maintains historical values of the input trace, including time offsets of the pre-synaptic spike events, over a set of prior epochs, to facilitate historic reconstruction of the input trace.

In Example 83, the subject matter of Example 82 optionally includes wherein the historical values of the input trace are used to compute trace values for a current epoch at fanout synapses with nonzero network delay.

In Example 84, the subject matter of any one or more of Examples 81-83 optionally include wherein the input data store and each trace-specific data store update their stored traces only once per learning epoch except to record any spike event occurrences within the learning epoch.

In Example 85, the subject matter of any one or more of Examples 81-84 optionally include means for applying learning rules unconditionally in response to passage of a predefined number of learning epochs.

In Example 86, the subject matter of any one or more of Examples 69-85 optionally include wherein the means for applying a set of one or more learning rules include means for accessing a plurality of different learning rule profiles.

In Example 87, the subject matter of any one or more of Examples 69-86 optionally include wherein the means for applying a set of one or more learning rules include means for applying a plurality of different learning rules.

In Example 88, the subject matter of any one or more of Examples 69-87 optionally include means for comparing the pre-synaptic or post-synaptic state variables against a learning exit condition, and for terminating a learning operation upon satisfaction of the learning exit condition.

In Example 89, the subject matter of any one or more of Examples 69-88 optionally include means for applying learning rules that are expressed as a sum-of-products semantic, with each product comprising a programmable series of trace values, synaptic parameters, and constants.

In Example 90, the subject matter of any one or more of Examples 69-89 optionally include wherein each neuron is configured to include: an input to accept pre-synaptic signaling from an input axon associated with the neuromorphic core; a synapse to store and distribute input and feedback signaling for processing, the synapse including a set of pre-synaptic terminals; and an output to carry post-synaptic signaling from the neuron to other neurons.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

The example embodiments described herein may include, or may operate on, logic or a number of components, functions, processes, or engines, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more computer systems (e.g., a standalone, client or server computer system) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A neuromorphic computing apparatus comprising:
   computing hardware, including processing and data storage circuitry;
   a network of spiking neural network cores implemented in the computing hardware, each core including an input axon and a plurality of neurons, including synapses, wherein the input axon is common to the plurality of neurons;
   wherein the input axon is associated with an input data store to store an input trace representing a time series of pre-synaptic spike events that are filtered according to a filtering function, and accessible by the synapses of the plurality of neurons of the core;

wherein each one of the plurality of neurons includes at least one dendritic compartment to store and process variables representing a dynamic state of the neuron, and wherein the at least one dendritic compartment is associated with a compartment-specific data store to store an output trace representing a time series of post-synaptic spike events that are filtered according to a filtering function; and wherein each one of the plurality of neurons includes a learning engine to:
apply a set of one or more learning rules based on the pre-synaptic and post-synaptic spike events to produce an adjustment of parameters of a corresponding synapse to those spike events; and
compare the pre-synaptic or post-synaptic state variables against a learning exit condition, wherein upon satisfaction of the learning exit condition, the learning engine is to terminate a learning operation.

2. The apparatus of claim 1, wherein the input data store is to store a plurality of input traces.

3. The apparatus of claim 1, wherein the compartment-specific data store associated with each of the at least one compartment is to store a plurality of output traces.

4. The apparatus of claim 1, wherein the input axon is a dedicated reward axon responsive to reinforcement-learning signaling, and wherein the learning engine is to read, process, and adjust, the reinforcement-learning signaling according to applicable learning rules.

5. The apparatus of claim 1, wherein the input axon is associated with a reinforcement-learning data store that stores at least one reinforcement-learning trace representing a temporal sequence of reinforcement-learning state variables.

6. The apparatus of claim 1, wherein the adjustment of the parameters of the corresponding synapse includes at least one adjustment selected from among: weighting adjustment, delay adjustment, tag adjustment, or any combination thereof.

7. The apparatus of claim 1, wherein the learning engine is to access a forward-mapping data structure that associates fan-outs of the input axon with dendritic compartments that are responsive to stimuli arriving on the input axon.

8. The apparatus of claim 1, wherein the learning engine is to access a backward-mapping data structure that associates each dendritic compartment to a corresponding set of fan-in input axons.

9. The apparatus of claim 1, wherein the learning engine is to perform a learning cycle in response to a predefined passage of time steps, wherein the predefined passage of time steps represents a learning epoch.

10. The apparatus of claim 9, wherein the input data store maintains historical values of the input trace, including time offsets of the pre-synaptic spike events, over a set of prior epochs, to facilitate historic reconstruction of the input trace.

11. The apparatus of claim 10, wherein the historical values of the input trace are used to compute trace values for a current epoch at fanout synapses with nonzero network delay.

12. The apparatus of claim 9, wherein the input data store update stored traces for decay only once per learning epoch.

13. The apparatus of claim 9, wherein the learning engine applies learning rules unconditionally in response to passage of a predefined number of learning epochs.

14. The apparatus of claim 1, wherein the learning engine is programmable to access a plurality of different learning rule profiles.

15. The apparatus of claim 1, wherein the learning engine is programmable to apply a plurality of learning rules.

16. The apparatus of claim 1, wherein the learning engine is to apply learning rules that are expressed as a sum-of-products semantic, with each product comprising a programmable series of trace values, synaptic parameters, and constants available to the learning engine.

17. The apparatus of claim 1, wherein each neuron includes:
an input to accept pre-synaptic signaling from an input axon associated with the neuromorphic core;
a synapse to store and distribute input and feedback signaling for processing, the synapse including a set of pre-synaptic terminals; and
an output to carry post-synaptic signaling from the neuron to other neurons.

18. The apparatus of claim 1, wherein the learning engine includes a spike timing-dependent plasticity (STDP) engine.

19. A method for operating a neuromorphic computing system, the method being executed by computing hardware, and comprising:
configuring a network of spiking neural network cores in the computing hardware, each core including an input axon and a plurality of neurons, including synapses, wherein the input axon is common to the plurality of neurons;
associating the input axon with an input, data store to store an input trace representing a time series of pre-synaptic spike events that are filtered according to a filtering function, and accessible by the synapses of the plurality of neurons of the core;
providing each one of the plurality of neurons with at least one dendritic compartment to store and process variables representing a dynamic state of the neuron;
associating the at least one dendritic compartment with a compartment-specific data store to store an output trace representing a time series of post-synaptic spike events that are filtered according to a filtering function; and
for each one of the plurality of neurons;
applying a set of one or more learning rules based on the pre-synaptic and post-synaptic spike events to produce an adjustment of parameters of a corresponding synapse to those spike events; and
comparing the pre-synaptic or post-synaptic state variables against a learning exit condition, wherein upon satisfaction of the learning exit condition, the learning engine is to terminate a learning operation.

20. The method of claim 19, wherein the input axon is a dedicated reward axon responsive to reinforcement-learning signaling, and further comprising:
reading, processing, and adjusting, the reinforcement-learning signaling according to applicable learning rules.

21. The method of claim 19, wherein the input axon is associated with a reinforcement-learning data store that stores at least one reinforcement-learning trace representing a temporal sequence of reinforcement-learning state variables.

22. At least one non-transitory machine-readable medium containing instructions that, when executed by computing hardware, cause the computing hardware to perform:
configuring a network of spiking neural network cores in the computing hardware, each core including an input axon and a plurality of neurons, including synapses, wherein the input axon is common to the plurality of neurons;

associating the input axon with an input data store to store an input trace representing a time series of pre-synaptic spike events that are filtered according to a filtering function, and accessible by the synapses of the plurality of neurons of the core;

providing each one of the plurality of neurons with at least one dendritic compartment to store and process variables representing a dynamic state of the neuron;

associating the at least one dendritic compartment with a compartment-specific data store to store an output trace representing a tune series of post-synaptic spike events that are filtered according to a filtering function; and for each one of the plurality of neurons;
  applying a set of one or more learning rules based on the pre-synaptic and post-synaptic spike events to produce an adjustment of parameters of a corresponding synapse to those spike events; and
  comparing the pre-synaptic or post-synaptic state variables against a learning exit condition, wherein upon satisfaction of the learning exit condition, the learning engine is to terminate a learning operation.

23. The at least one non-transitory machine-readable medium of claim 22, further comprising instructions for performing a learning cycle in response to a predefined passage of time steps, wherein the predefined passage of time steps represents a learning epoch.

24. The at least one non-transitory machine-readable medium of claim 23, wherein the input data store maintains historical values of the input trace, including time offsets of the pre-synaptic spike events, over a set of prior epochs, to facilitate historic reconstruction of the input trace.

25. The at least one non-transitory machine-readable medium of claim 23, further comprising instructions for applying learning rules unconditionally in response to passage of a predefined number of learning epochs.

* * * * *

UNITED STATES PATENT AND TRADEMARK OFFICE
CERTIFICATE OF CORRECTION

PATENT NO. : 11,037,054 B2
APPLICATION NO. : 15/385219
DATED : June 15, 2021
INVENTOR(S) : Davies et al.

Page 1 of 1

It is certified that error appears in the above-identified patent and that said Letters Patent is hereby corrected as shown below:

In the Claims

In Column 28, Line 28, in Claim 19, delete "input," and insert --input-- therefor In Column 29, Line 11, in Claim 22, delete "tune" and insert --time-- therefor Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*